(12) United States Patent
Matsumoto et al.

(10) Patent No.: US 8,218,219 B2
(45) Date of Patent: Jul. 10, 2012

(54) MICRO-MIRROR ARRAY AND OPTICAL SWITCH

(75) Inventors: Tsuyoshi Matsumoto, Kawasaki (JP); Norinao Kouma, Kawasaki (JP); Osamu Tsuboi, Kawasaki (JP); Hiroshi Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/999,854

(22) Filed: Dec. 17, 2010

(65) Prior Publication Data

US 2011/0222137 A1 Sep. 15, 2011

Related U.S. Application Data

(63) Continuation of application No. PCT/JP2009/003084, filed on Jul. 2, 2009.

(30) Foreign Application Priority Data

Jul. 2, 2008 (JP) .................................. 2008-173821

(51) Int. Cl.
*G02B 26/08* (2006.01)
(52) U.S. Cl. .................................................. 359/226.1
(58) Field of Classification Search .... 359/212.1–214.1, 359/223.1–226.1
See application file for complete search history.

(56) References Cited

U.S. PATENT DOCUMENTS

| 6,806,992 | B2 | 10/2004 | Soneda et al. |
| 6,906,849 | B1 | 6/2005 | Mi et al. |
| 6,984,917 | B2 | 1/2006 | Greywall et al. |
| 2002/0050744 | A1* | 5/2002 | Bernstein et al. ............... 310/12 |
| 2004/0187573 | A1 | 9/2004 | Sakai et al. |
| 2004/0212864 | A1 | 10/2004 | Greywall et al. |
| 2005/0018091 | A1 | 1/2005 | Patel et al. |
| 2005/0231787 | A1 | 10/2005 | Tsuboi et al. |
| 2005/0243396 | A1 | 11/2005 | Fujii et al. |
| 2006/0028094 | A1 | 2/2006 | Greywall et al. |
| 2006/0120425 | A1 | 6/2006 | Kouma et al. |
| 2006/0227409 | A1 | 10/2006 | Pardo et al. |
| 2008/0054758 | A1 | 3/2008 | Tsuboi et al. |

FOREIGN PATENT DOCUMENTS

| JP | 2003-344785 A | 12/2003 |
| JP | 2004-294332 A | 10/2004 |
| JP | 2005-305582 A | 11/2005 |
| JP | 2005-308863 A | 11/2005 |
| JP | 2005-326620 A | 11/2005 |
| JP | 2006-162699 A | 6/2006 |
| JP | 2006-528793 A | 12/2006 |
| JP | 2007-140558 A | 6/2007 |
| JP | 2008-055516 A | 3/2008 |

OTHER PUBLICATIONS

International Search Report of PCT/JP2009/003084, mailing date Sep. 8, 2009.

\* cited by examiner

*Primary Examiner* — Euncha Cherry
(74) *Attorney, Agent, or Firm* — Fujitsu Patent Center

(57) ABSTRACT

A micro-mirror array including a plurality of micro-mirror elements and each of the micro-mirror elements includes a mirror rotating around two axes and a support unit connected to an outer frame and supporting the mirror. The support unit extends between the mirror of the micro-mirror elements including the support unit and one of two mirrors adjacent to the mirror, and both ends of the support unit are connected to the outer frame.

17 Claims, 30 Drawing Sheets

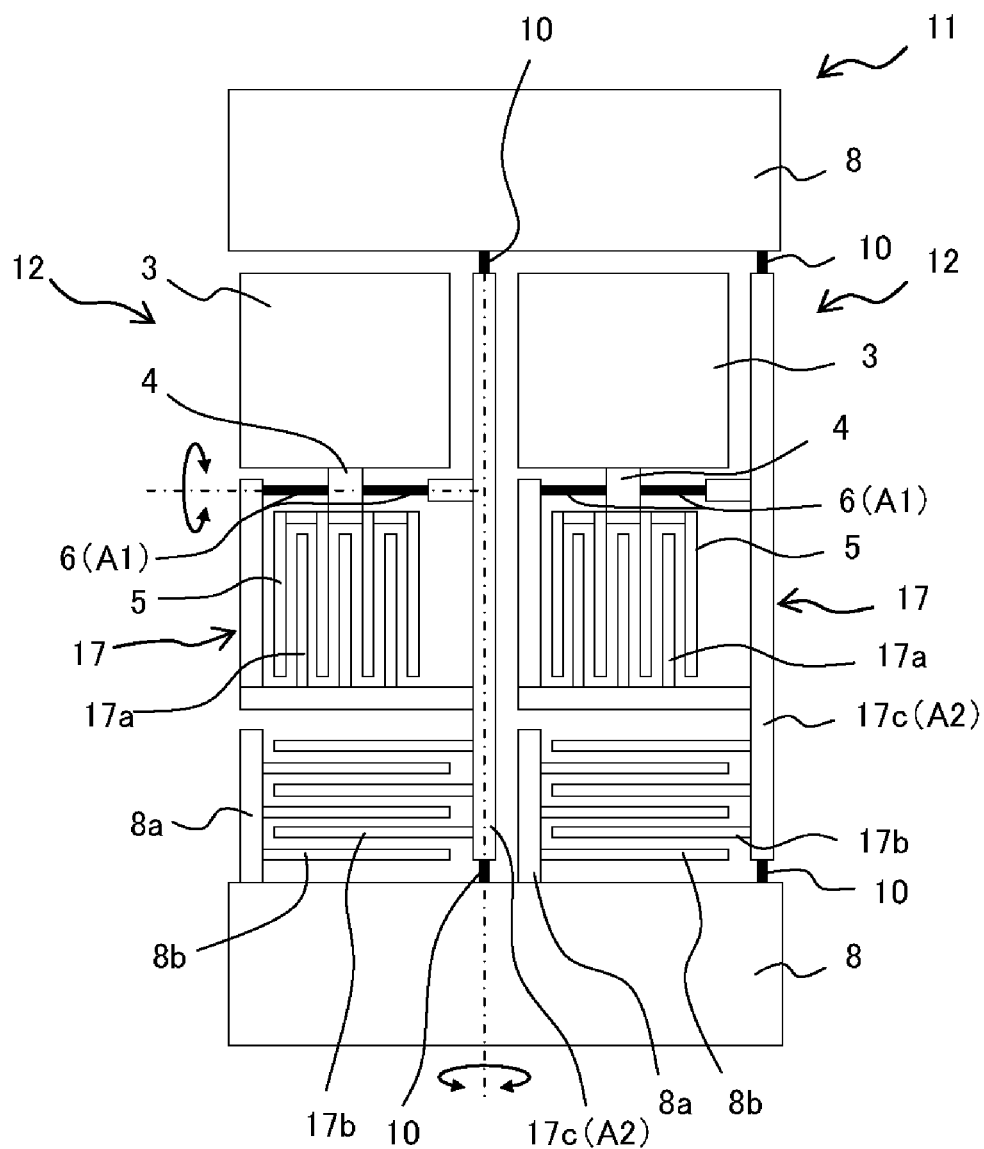
F I G. 2

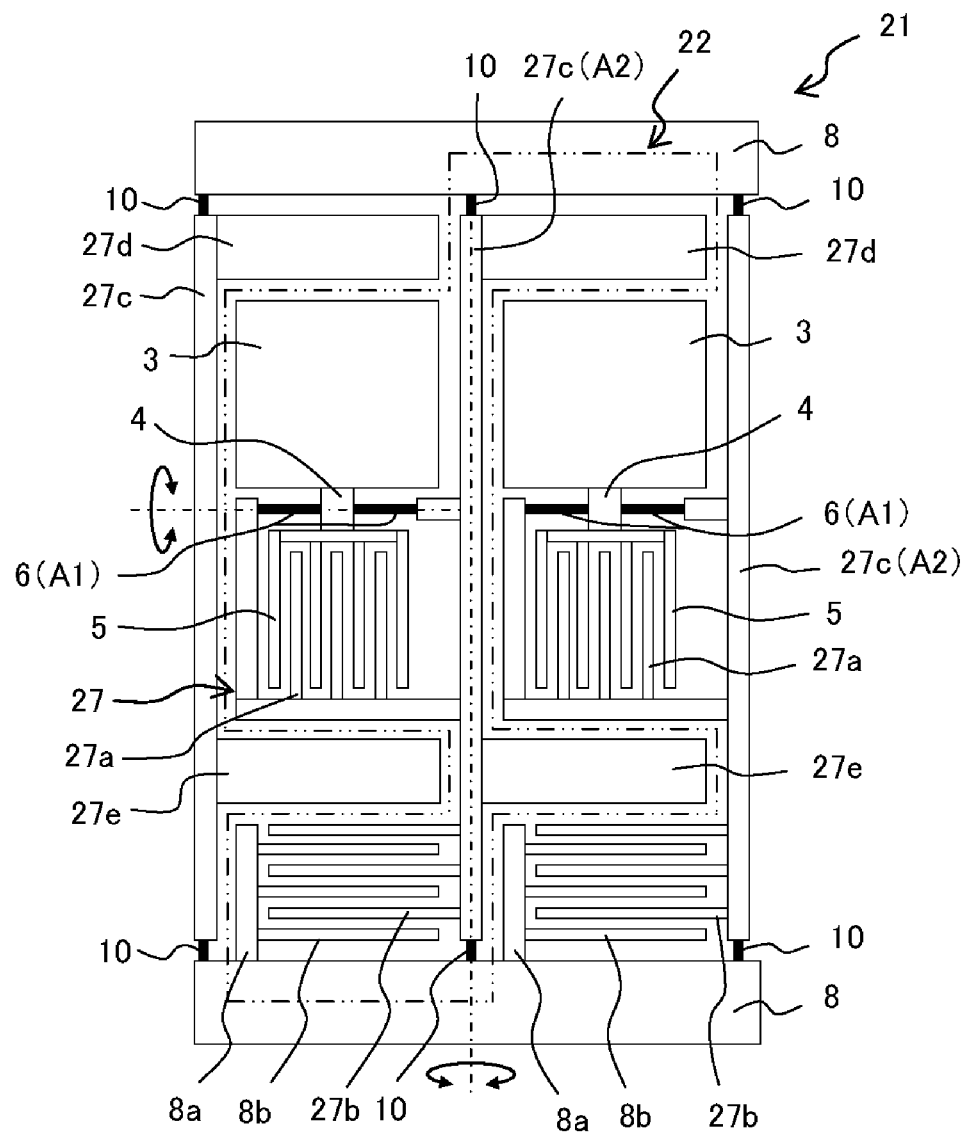
F I G. 3

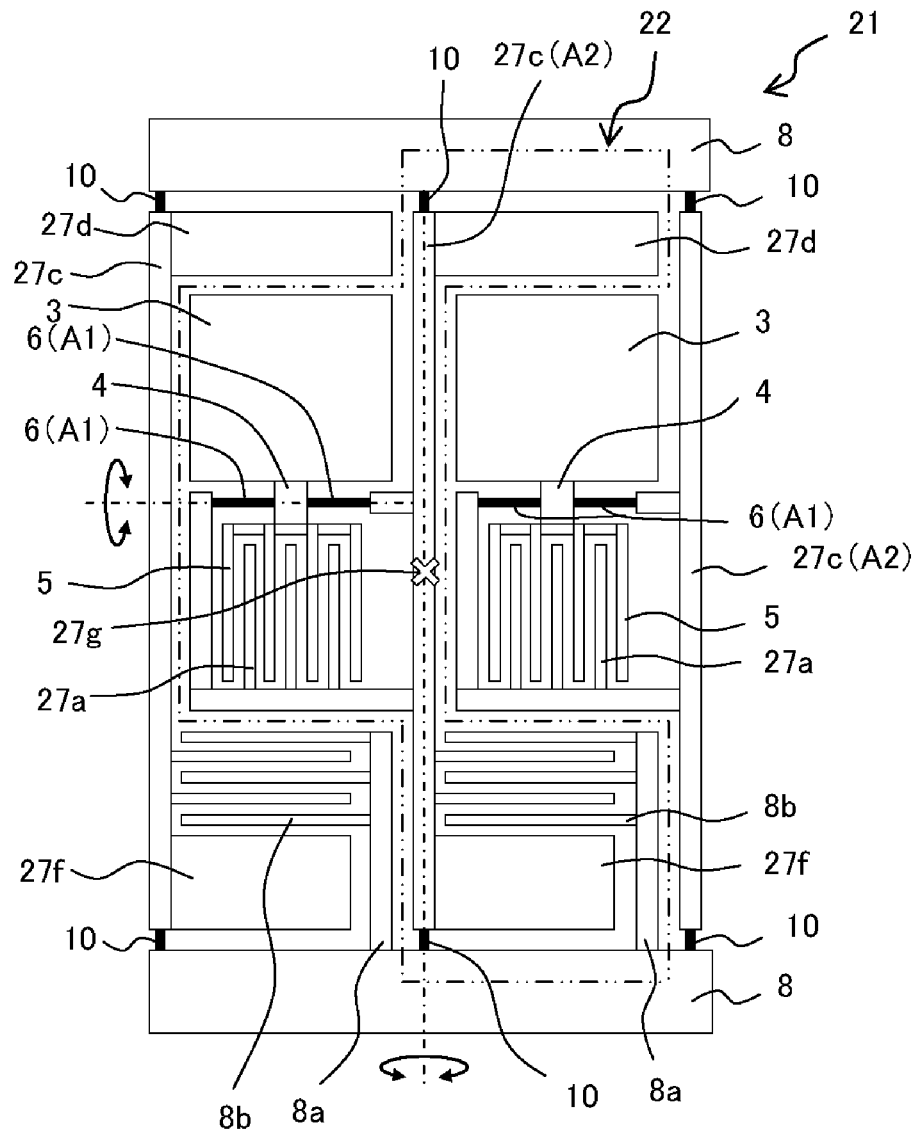
F I G. 4

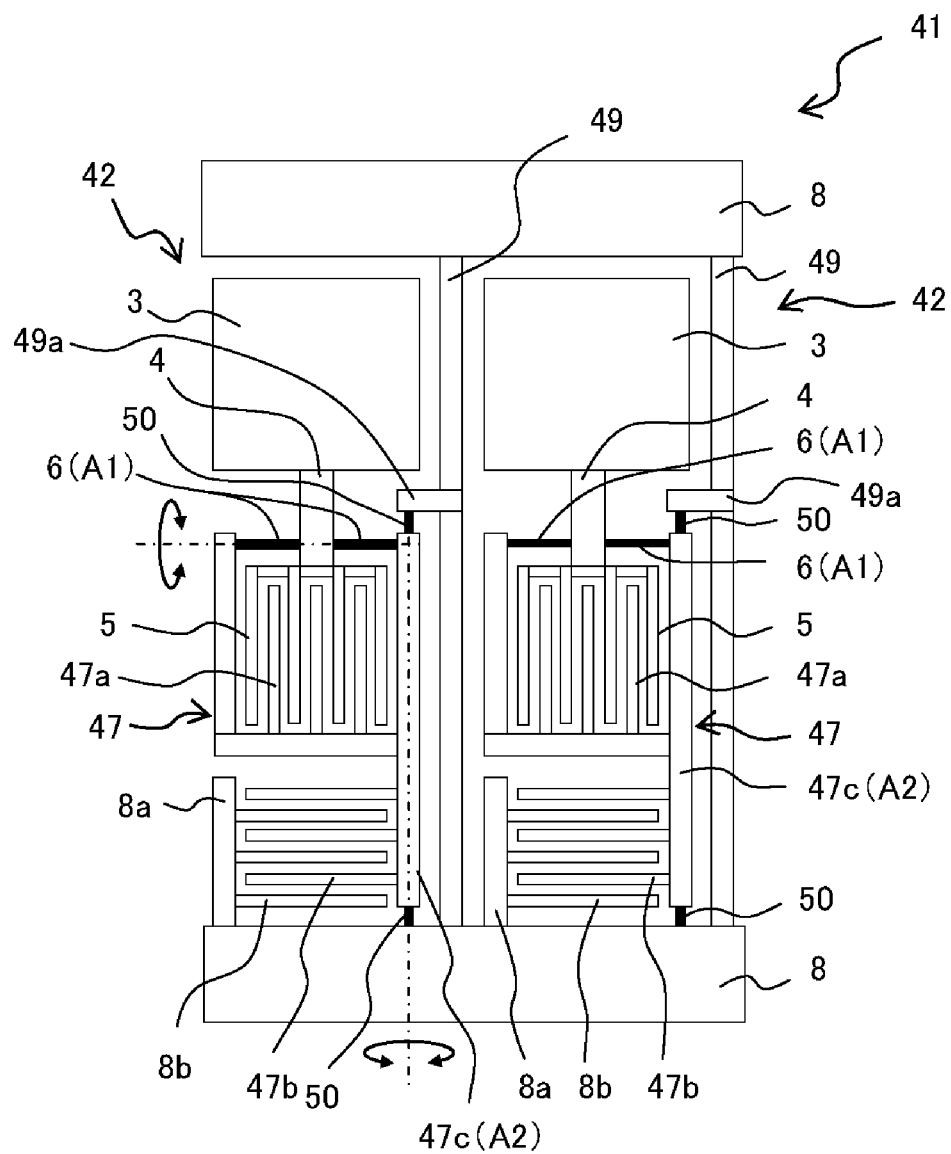
F I G. 6

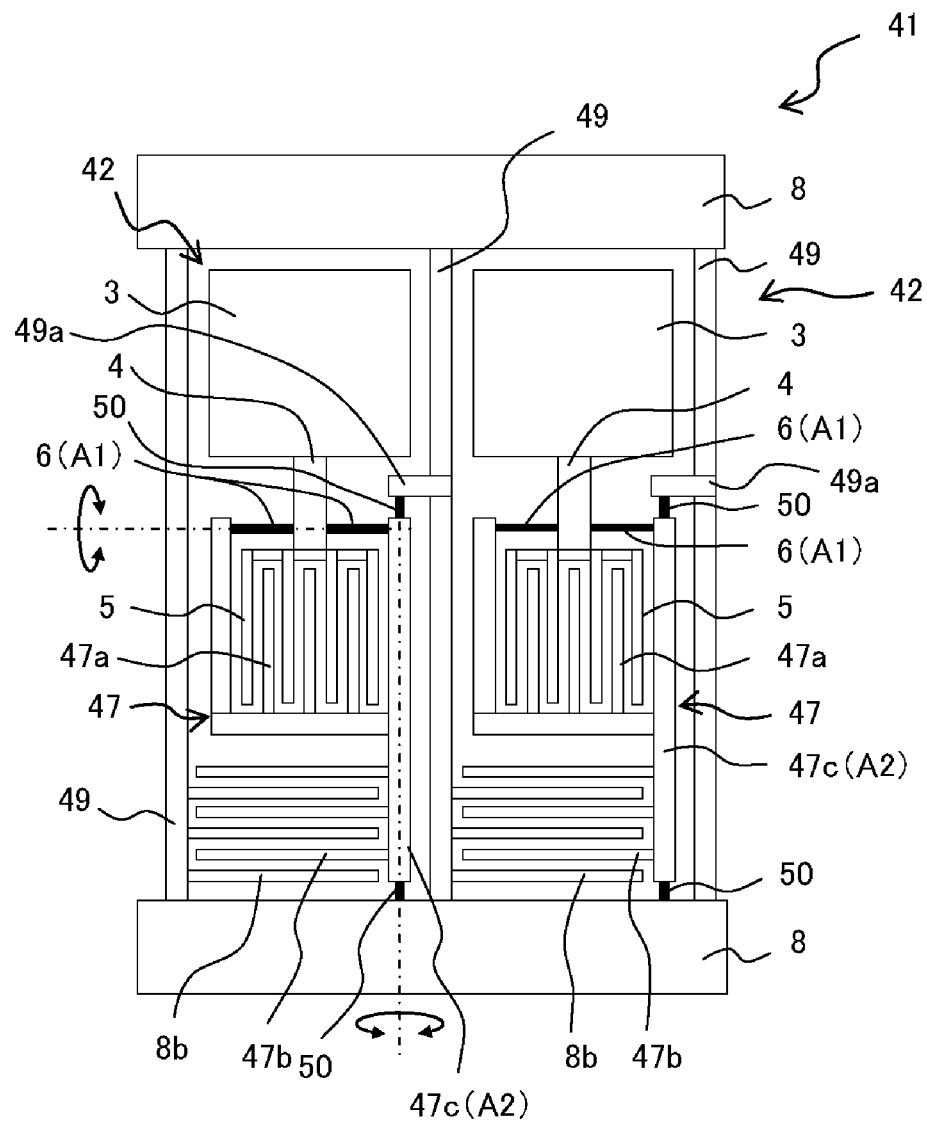
F I G. 7

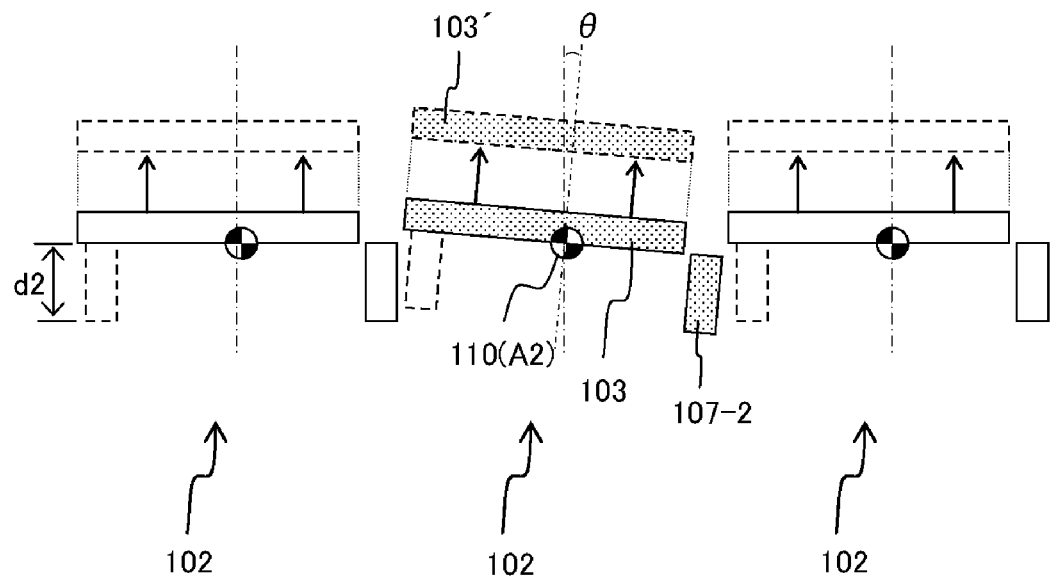
F I G. 1 4 A

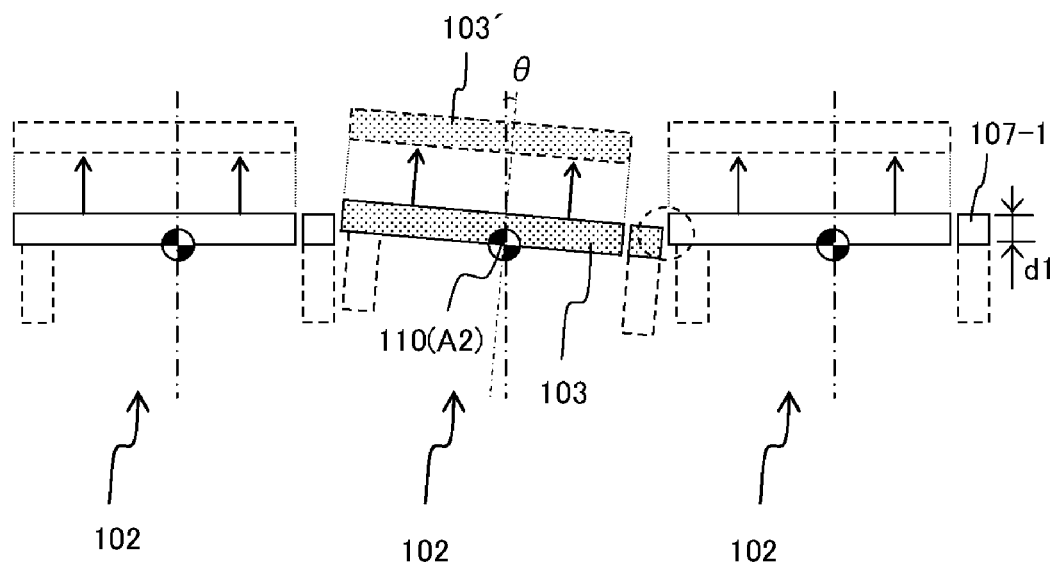
F I G. 14B

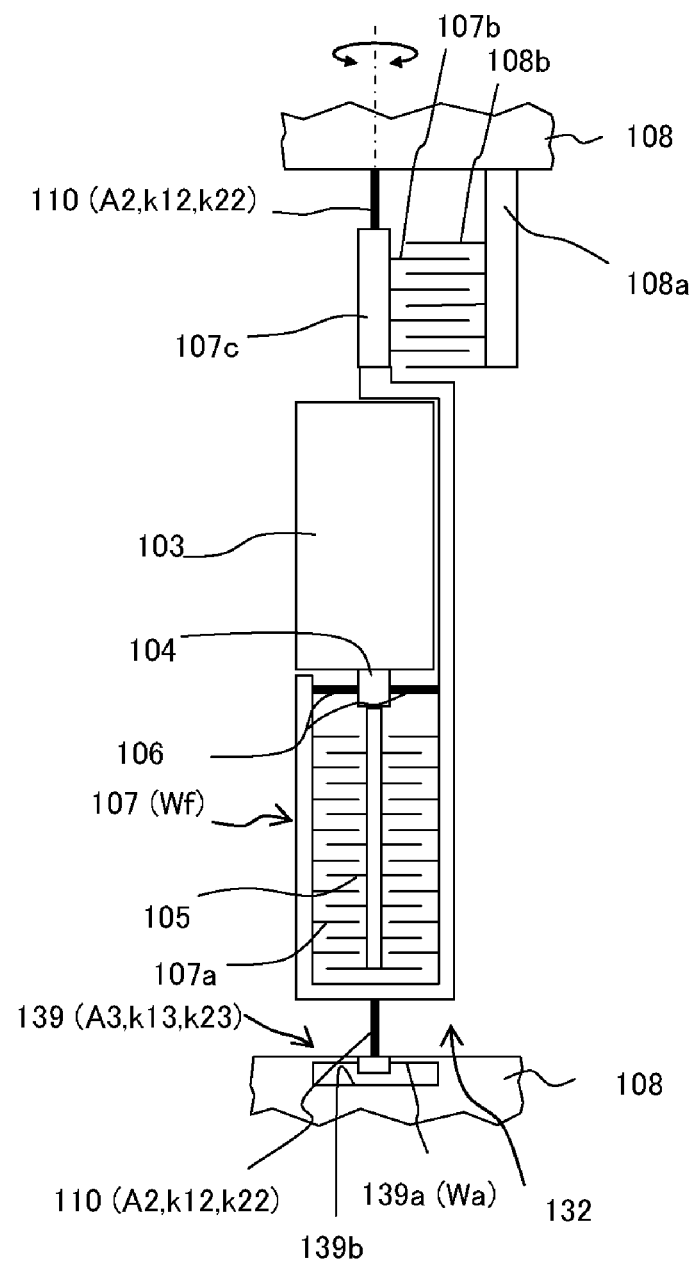
F I G. 15C

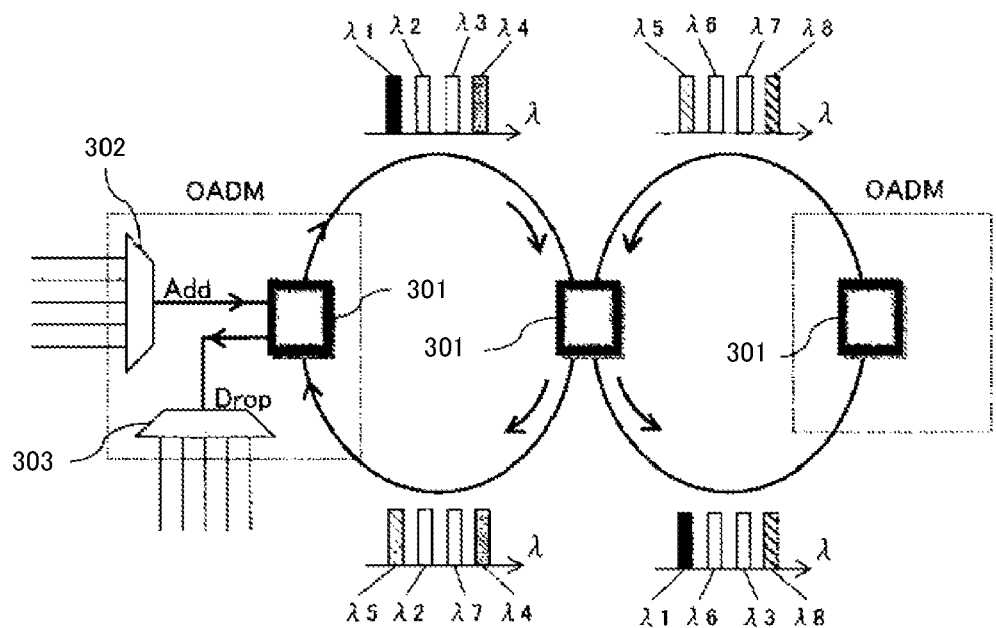
F I G. 19

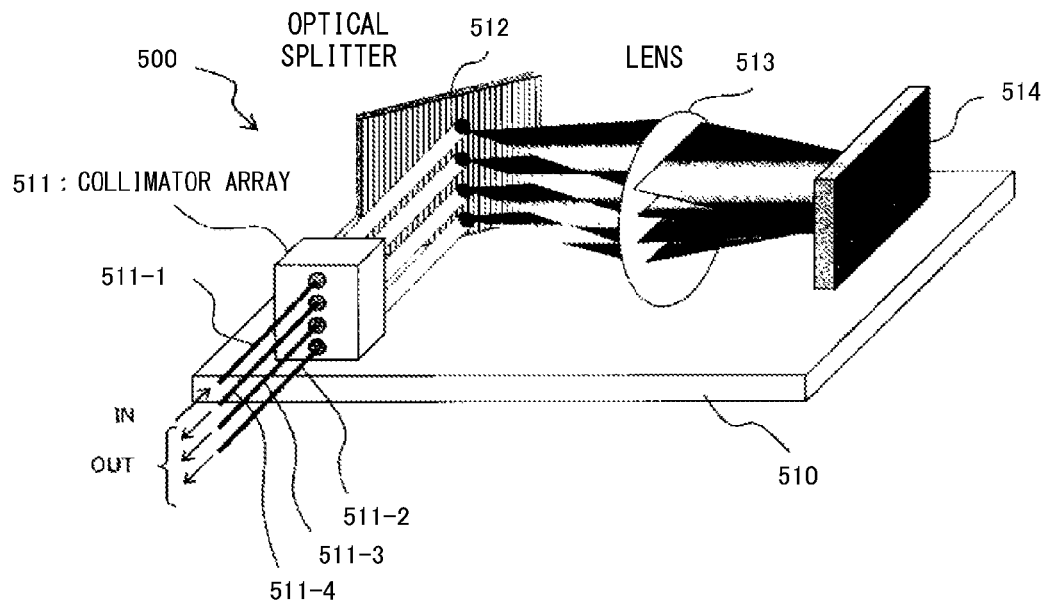
F I G. 2 1

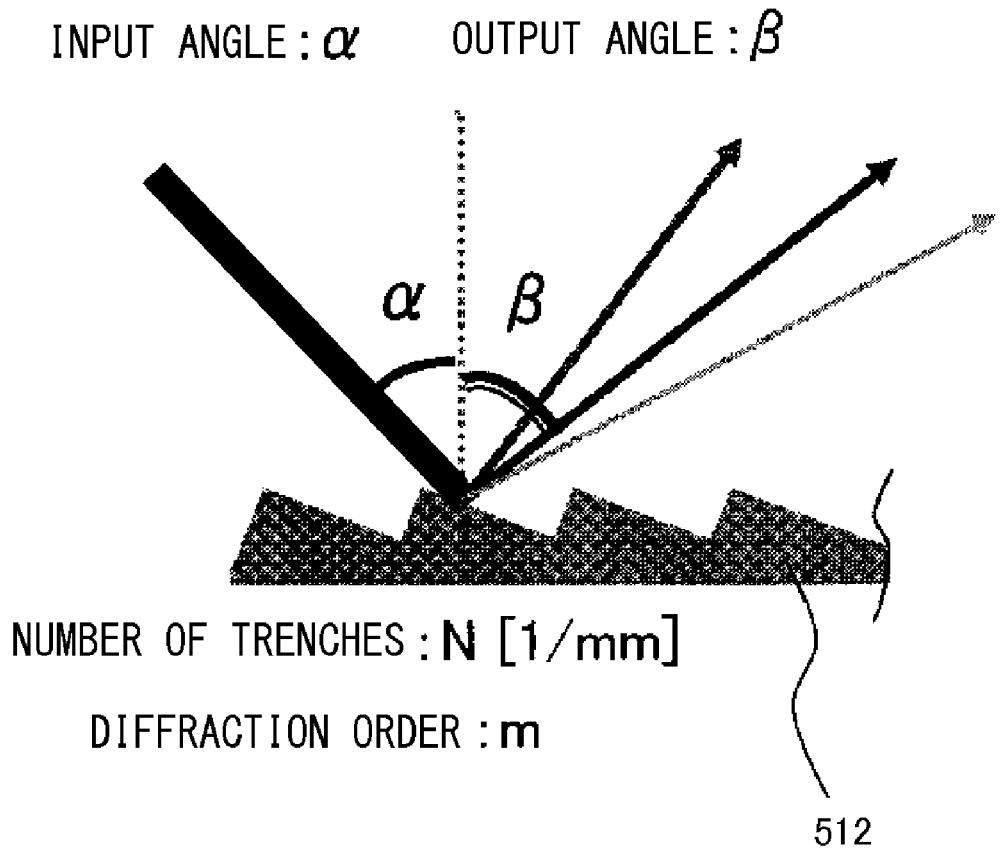
F I G. 2 3

MICRO-MIRROR ARRAY AND OPTICAL SWITCH

CROSS-REFERENCE TO RELATED APPLICATION

This application is a continuation of PCT application PCT/JP2009/003084 filed on Jul. 2, 2009, the entire contents of which are incorporated herein by reference.

This application is based upon and claims the benefit of priority of the prior Japanese Patent Application No. 2008-173821 filed on Jul. 2, 2008, the entire contents of which are incorporated herein by reference.

FIELD

The embodiments discussed herein are related to a micro-mirror array used for an optical switch and an optical attenuator, for example, and to an optical switch including the micro-mirror array.

BACKGROUND

In optical switches that switch optical paths in optical transmission lines, micro-mirror elements (MEMS mirror elements) that reflect light output from an optical fiber to an optical path of any optical fiber via a rotating (swinging) mirror have been conventionally used (e.g., see Patent Document 1).

FIG. 24 is an overview plan view illustrating a related micro-mirror array.

In FIG. 24, a micro-mirror array 81 has a number of micro-mirror elements 82 arranged in one direction. A mirror 83 in each of the micro-mirror elements 82 is coupled to a mirror-side movable electrode (comb-like electrode) 85 via a mirror arm 84. The mirror 83 is supported by an inner frame 87 via a pair of torsion bars 86, 86 in the mirror arm 84, and is rotatable (swingable) around a rotation axis of the torsion bars 86, 86.

The inner frame 87 is disposed so as to cover the mirror 83 and the mirror side movable electrode 85, and has a mirror-side fixed electrode (comb-like electrode) 87a placed opposite the mirror-side movable electrode 85. By electrostatic force generated by the mirror-side movable electrode 85 and the mirror side fixed electrode 87a operating together, the mirror 83 connected to the mirror arm 84 is rotatable (swingable) around the rotation axis of the torsion bars 86, 86 together with the mirror arm 84 and the mirror-side movable electrode 85.

An inner frame arm 87b is provided on a side in the inner frame 87 opposite to the side where the mirror 83 is placed, and an inner-frame-side movable electrode (comb-like electrode) 87c is provided along the side surface of the inner frame arm 87b. On an outer frame arm 88a, an end of which is fixed on an outer frame 88, an outer frame fixed electrode (comb-like electrode) 88b is provided. The inner-frame-side movable electrode 87c and the outer frame fixed electrode 88b are placed opposite to each other. The inner frame 87 is supported by the outer frame 88 so as to be rotatable around torsion bars 89, 89, with one side being connected to the inner frame arm 87b.

With the electrostatic force generated by operating the inner-frame-side movable electrode 87c and the outer-frame-side fixed electrode 88b together, the inner frame 87 is rotatable (swingable) around a rotation axis of the torsion bars 89, 89.

Each of the above-described micro-mirror elements 82 has the inner frame 87 arranged so as to cover the mirror 83, and for that reason, portions of two of the inner frames 87 are positioned between the two adjacent mirrors 83. As a result, mirror occupancy (mirror width Wm relative to mirror pitch Wp) in a mirror alignment direction cannot be increased.

For example, an optical wavelength selection switch splits an optically multiplexed signal from an input port to single signals with every wavelength, reflects these signals with a micro-mirror array, and sorts the signals into desired output ports. The micro-mirror array used here needs to have a wide reflection (transmission) band of optical signals (a narrow reflection band results in degradation of transmission quality of the optical signals). Although the mirror array is arranged in accordance with the signal (wavelength) interval of the optically multiplexed signals, the mirror reflection (transmission) band with respect to an optical signal is determined by the mirror occupancy, and therefore greater mirror occupancy is desired.

In the micro-mirror array disclosed in Patent Document 2, micro-mirror elements arranged so as to project mirrors are alternately disposed in a mirror alignment direction so as to be opposite to each other and have the mirrors close to one another in the mirror alignment direction.

Patent Document 1: Japanese Laid-open Patent Publication No. 2005-305582

Patent Document 2: U.S. Pat. No. 6,984,917

SUMMARY

According to an aspect of the invention, a micro-mirror array includes a plurality of micro-mirror elements and each of the micro-mirror elements includes a mirror rotating around two axes and a support unit connected to an outer frame and supporting the mirror. The support unit extends between the mirror of the micro-mirror elements including the support unit and one of two mirrors adjacent to said mirror, and both ends of the support unit are connected to the outer frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic plan view illustrating a micro-mirror array according to the second embodiment of the present invention.

FIG. 3 is a schematic plan view illustrating a micro-mirror array according to the third embodiment of the present invention.

FIG. 4 is a schematic plan view illustrating a micro-mirror array according to a modification of the third embodiment of the present invention.

FIG. 6 is a schematic plan view illustrating a micro-mirror array according to the fifth embodiment of the present invention.

FIG. 7 is a schematic plan view illustrating a micro-mirror array according to a modification of the fifth embodiment of the present invention.

FIG. 14A is a schematic cross-sectional view taken from c-c' of FIG. 13.

FIG. 14B is a schematic cross-sectional view of the first modification of the seventh embodiment of the present invention.

FIG. 15C is a schematic plan view illustrating a micro-mirror element according to the second modification of the eighth embodiment of the present invention.

FIG. 19 is a block diagram illustrating a configuration of a ring-topology network to which a wavelength selection switch is applied.

FIG. 21 is a schematic perspective view illustrating the major portion of the spatial coupling type wavelength selecting switch.

FIG. 23 is a partially enlarged view illustrating a commonly used diffraction grating, which is an example of an optical splitter.

DESCRIPTION OF EMBODIMENTS

The micro-mirror array disclosed in the above Patent Document 2 (U.S. Pat. No. 6,984,917) has to have the opposing micro-mirror elements disposed alternately in order to increase the mirror occupancy in the mirror alignment direction, which causes a problem of increase in the size of the micro-mirror array due to the limitation of the alignment of the micro-mirror elements.

It should be noted that when all of the micro-mirror elements disclosed in Patent Document 2 are oriented to face one direction, the width of the portion supporting the mirror is wider than the width of the mirror, and therefore the mirror occupancy cannot be improved. In addition, since the supporting position of the inner frame is closer to one end of a mirror element (an end opposite to the mirror), poor resistance to oscillations and impacts on the mirror elements is a concern.

In the following description, a micro-mirror array (MEMS-mirror array) according to the embodiment is explained with reference to the drawings.

<First Embodiment>

Figure 1:
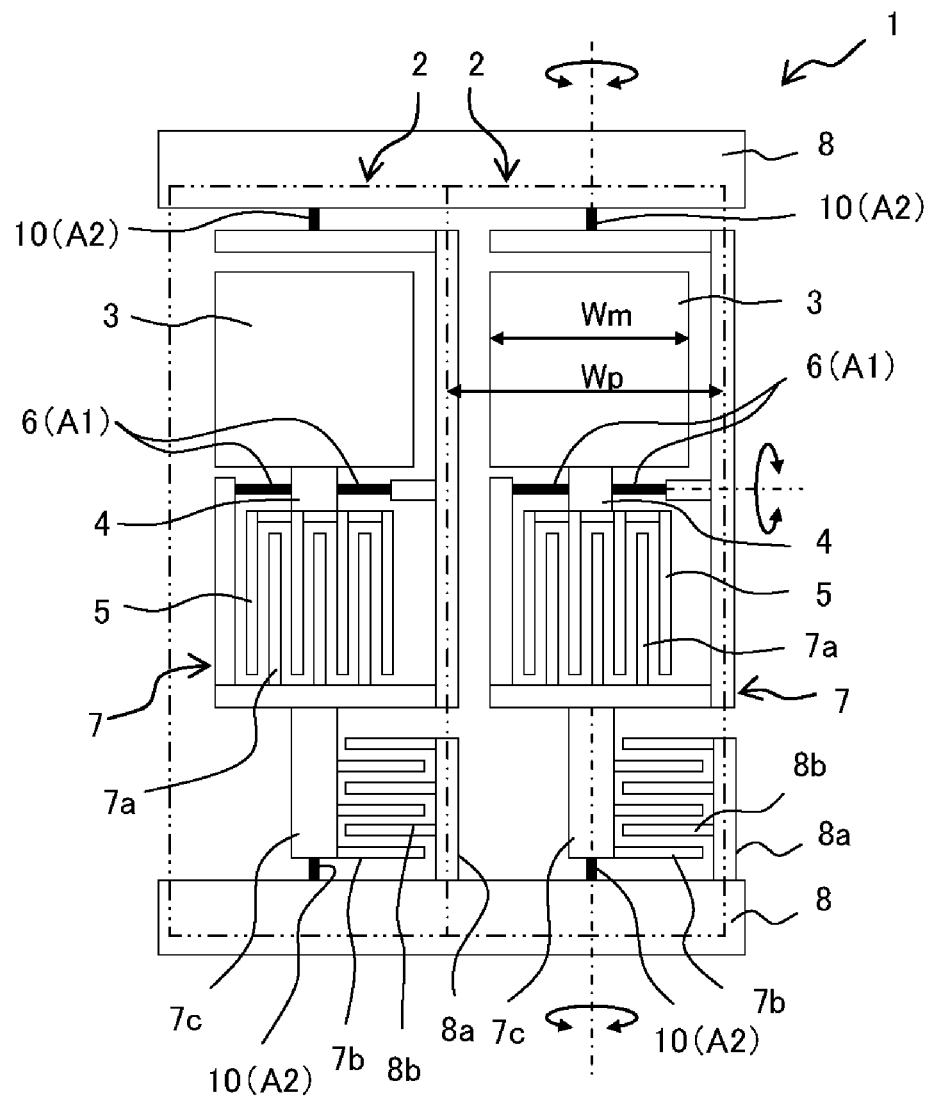
FIG. 1 is a schematic plan view illustrating a micro-mirror array according to the first embodiment of the present invention.

FIG. 1 is a schematic plan view illustrating a micro-mirror array according to the first embodiment of the present invention. It should be noted that although only two micro-mirror elements 2 are illustrated in FIG. 1, three or more micro-mirror elements 2 can be aligned in a micro-mirror array 1.

The micro-mirror array 1 illustrated in FIG. 1 has the micro-mirror elements 2 aligned in one direction (in a horizontal direction in FIG. 1). Although the details are explained later, each of the micro-mirror elements 2 includes a mirror 3 rotating around two axes, and an inner frame 7 connected to an outer frame 8 and serving as a support unit of the mirror 3.

The mirror 3 is connected to the mirror-side movable electrode (comb-like electrode) 5. The inner frame 7 is formed so as to surround the mirror-side movable electrode 5, and supports a mirror arm 4 via a pair of torsion bars 6, 6 (first axis A1).

A mirror-side fixed electrode (comb-like electrode) 7a facing the mirror-side movable electrode 5 is provided in the inner frame 7. Using the static force generated by operating the mirror-side movable electrode 5 and the mirror-side fixed electrode 7a together, the mirror 3 connected to the mirror arm 4 becomes rotatable (swingable) around the torsion bars 6, 6 as a rotation axis (first axis A1) with the mirror arm 4 and the mirror-side movable electrode 5.

The inner frame 7 extends between the mirror 3 of the micro-mirror element 2 including this inner frame 7 and one of two mirrors 3 adjacent to the mirror 3, and is bent before reaching the outer frame 8 on the mirror 3 side so that the inner frame 7 extends parallel to the supporting face of the outer frame 8. The portion extending parallel to the supporting face of the outer frame 8 in the inner frame 7 is supported via a torsion bar 10 (second axis A2) so as to be rotatable with respect to the outer frame 8.

An inner frame arm 7c is provided at the end opposite to the mirror 3 in the inner frame 7, and an inner-frame-side movable electrode (comb-like electrode) 7b is provided on the side face of the inner frame arm 7c. An outer-frame-side fixed electrode (comb-like electrode) 8b is provided on the outer frame arm 8a that is fixed on the outer frame 8 at one of its ends. The inner-frame-side movable electrode 7b and the outer-frame-side fixed electrode 8b are placed opposite to each other. The end of the inner frame arm 7c in the inner frame 7 is supported, similarly to the end on the mirror 3 side, via a torsion bar 10 (second axis A2) so as to be rotatable with respect to the outer frame 8.

Using the static force generated by operating the inner-frame-side movable electrode 7b and the outer-frame-side fixed electrode 8b together, the inner frame 7 becomes rotatable (swingable) around the torsion bars 10 as a rotation axis (second axis A2) with respect to the outer frame 8.

As described above, the mirror 3 can perform rotary motions around two axes: a rotary motion around the rotation axis of the torsion bars 6, 6, (first axis A1), and a rotary motion around the rotation axis of the torsion bars 10, 10 (second axis A2).

In the above-explained embodiment, the inner frame 7 serving as a support unit for supporting the mirror 3 extends between the mirror 3 of the micro-mirror element 2 including this inner frame 7 and one of two mirrors 3 adjacent to the mirror 3, and both of its ends are connected to the outer frame 8. For that reason, by aligning the micro-mirror elements 2 so as to be close to each other, the mirrors 3 can become close to each other in the mirror alignment direction. As a result, according to the present embodiment, mirror occupancy of the mirrors 3 rotating around two axes (mirror width Wm with respect to mirror pitch Wp) can be enhanced without any limitation in alignment of the micro-mirror elements 2.

In addition, in the present embodiment, the inner frame 7 supports the mirror 3 so as to be rotatable via the torsion bars 6, 6 (first axis A1). For that reason, the structure to support the mirror 3 can be simplified, and as a result, the integration of the micro-mirror elements 2 can be facilitated.

It should be noted that the driving unit for rotating the mirror 3 and other components is described as a comb-like electrode in the present embodiment. However, the driving method for rotation is not limited to the comb-like electrode.

<Second Embodiment>

The present embodiment is the same as the above first embodiment except for the structure in which a rotary axis 17c of an inner frame 17 (second axis A2) extends in a straight line between the outer frames 8. For that reason, the same reference numerals are assigned to the identical components in FIG. 2, and detailed descriptions are omitted.

FIG. 2 is a schematic plan view illustrating a micro-mirror array according to the second embodiment of the present invention.

In a micro-mirror element 12 in the micro-mirror array 11 illustrated in FIG. 2, the rotary axis 17c of the inner frame 17 (second axis A2), which supports the mirror 3, is connected to an outer frame 8 at both ends via torsion bars 10, 10, and extends in a straight line between the outer frames 8.

For that reason, unlike the above first embodiment, a portion at one end on the mirror 3 side of the inner frame 17, which extends in parallel with the outer frame, is not needed, simplifying the structure of the inner frame 17 or the structures of the micro-mirror elements 12 and of the micro-mirror array 11.

It should be noted that the outer surface at another end of the rotary axis 17c is provided with an inner-frame-side movable electrode (comb-like electrode) 17b.

In the above-explained embodiment, the inner frame 17 serving as a support unit for supporting the mirror 3 extends between the mirror 3 of the micro-mirror element 12 including this inner frame 7 and one of two mirrors 3 adjacent to the mirror 3, and both of its ends are connected to the outer frame 8. For that reason, by aligning the micro-mirror elements 12 so as to be close to each other, the mirrors 3 can become close to each other in the mirror alignment direction. As a result, according to the present embodiment as well, mirror occupancy of the mirrors 3 rotating around two axes (mirror width Wm with respect to mirror pitch Wp) can be enhanced without any limitation in alignment of the micro-mirror elements 12.

Additionally, in the present embodiment, the inner frame 17 extends in a straight line between the mirror 3 of the micro-mirror element 12 including this inner frame 17 and one of two mirrors 3 adjacent to the mirror 3 and has the rotary axis 17c (second axis A2) having both ends connected to the outer frames 8. For that reason, the structure of the inner frame 17 can be simplified and therefore integration of the micro-mirror elements 12 can be facilitated.

<Third Embodiment>

The present embodiment is the same as the above second embodiment except that balancers 27d and 27e are formed on an inner frame 27. For that reason, the components identical with those in the second embodiment are labeled with the same reference numerals in FIG. 3 and detailed descriptions are omitted.

FIG. 3 is a schematic plan view illustrating a micro-mirror array according to the third embodiment of the present invention.

In micro-mirror elements 22 of the micro-mirror array 21 illustrated in FIG. 3, a rotary axis 27c (second axis A2) of an inner frame 27, which supports the mirror 3, is provided with the balancers 27d and 27e between the mirror 3 of the adjacent micro-mirror element 22 and the outer frame 8 on the mirror 3 side, and between the mirror-side fixed electrode 27a and the inner-frame-side movable electrode 27b of the adjacent micro-mirror element 22, respectively.

The balancers 27d and 27e are placed so as to maintain the center of gravity of the inner frame 27 and portions rotating around the rotary axis 27c together with the inner frame 27 (in this embodiment, the mirror 3, the mirror arm 4, the mirror-side movable electrode 5, and the torsion bars 6, 6) as close as possible to the rotary axis 27c of the inner frame 27 in an alignment direction of the mirrors 3.

It should be noted that in the present embodiment, an example is given of placing two balancers 27d and 27e in the micro-mirror element 22. However, the number of balancers in each micro-mirror element can be one or three or larger.

In the above-described embodiment, the inner frame 27 serving as a support unit for the mirror 3 extends between the mirror 3 of the micro-mirror device 22 including the inner frame 27 and one of the two mirrors 3 adjacent to the mirror 3, and both ends are connected to the outer frames 8. For that reason, by aligning the micro-mirror elements 22 so as to be close to each other, the mirrors 3 can become close to each other in the mirror alignment direction. As a result, according to the present embodiment, mirror occupancy of the mirrors 3 rotating around two axes can be enhanced without any limitation in alignment of the micro-mirror elements 22.

In the present embodiment, also, the balancer 27d and 27e are placed so as to maintain the center of gravity of the inner frame 27 and portions rotating around the rotary axis 27c (second axis A2) together with the inner frame 27 (the mirror 3, the mirror arm 4, the mirror-side movable electrode 5, and the torsion bars 6, 6) as close as possible to the rotary axis 27c of the inner frame 27 in an alignment direction. For that reason, the inner frame 27 can be stably supported. Furthermore, resistance to the oscillation in the micro-mirror elements 22 can be improved.

In the present embodiment, the inner frame 27 rotates around its rotary axis 27c as the second axis A2, and the balancers 27d and 27e are placed on the rotary axis 27c. For that reason, the inner frame 27 can be further stably supported, and the resistance to the oscillation in the micro-mirror elements 22 can be further improved.

It should be noted that, as illustrated in FIG. 4, by placing the balancers 27d and 27f at both ends of the inner frame 27, the center of gravity of the inner frame and the portions rotating around the second axis A2 together with the inner frame 27 (the mirror 3, the mirror arm 4, the mirror-side movable electrode 5, and the torsion bars 6, 6) should be positioned at a center point 27g in the longitudinal direction of the rotary axis 27c. Accordingly, the inner frame 27 can be further stably supported and the resistance to oscillation in the micro-mirror elements 22 can be improved.

<Fourth Embodiment>

The present embodiment is different from the first through third embodiments in that a reinforcing beam 39 is connected to the outer frames at its ends and supports the inner frame 37 in a rotatable manner, but is mostly the same as the above embodiments for the rest of the components. For that reason, the components identical with those in the first embodiment are labeled with the same reference numerals in FIG. 5 and detailed descriptions are omitted.

Figure 5:
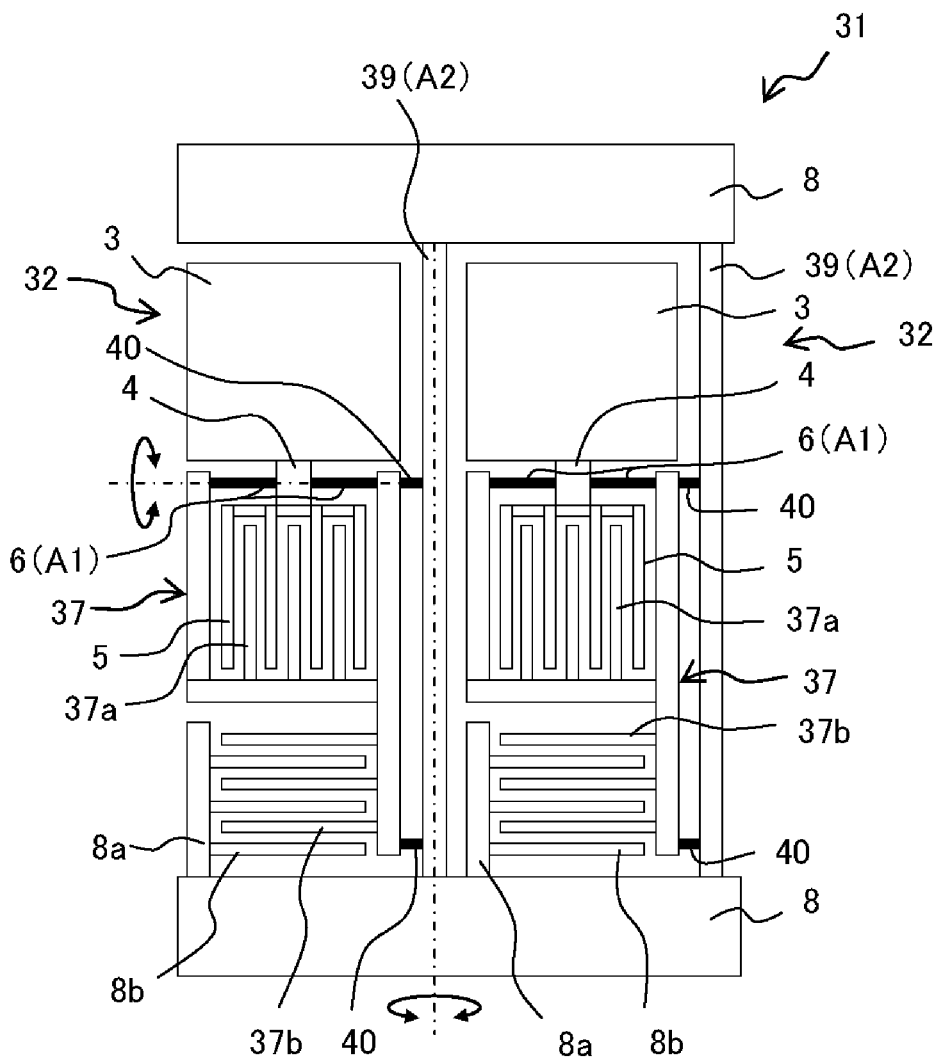
FIG. 5 is a schematic plan view illustrating a micro-mirror array according to the fourth embodiment of the present invention.

FIG. 5 is a schematic plan view illustrating a micro-mirror array according to the fourth embodiment of the present invention.

The micro-mirror elements 32 in a micro-mirror array 31 illustrated in FIG. 5 have an inner frame 37 and the reinforcing beam 39 disposed as a support unit that is connected to the outer frame 8 and is supporting the mirror 3.

The reinforcing beam 39 extends in a straight line between the mirror 3 of the micro-mirror element 32 including the reinforcing beam 39 and one of the two mirrors 3 adjacent to the mirror 3, and both ends are connected to the outer frames 8.

The inner frame 37 is supported at an end on the mirror 3 side and at another end on its opposite side by the reinforcing beam 39 so as to be rotatable via torsion bars 40, 40, and rotates around the reinforcing beam 39 serving as the second axis A2. It should be noted that the end on the mirror 3 side of the inner frame 37 is positioned closer to the outer-frame-side fixed electrode 8b than the mirror 3, and does not extend between the mirror 3 and the mirror 3.

In the above-described embodiment, the reinforcing beam 39 as a support unit (the reinforcing beam 39 and the inner frame 37) for supporting the mirror 3 extend between the mirror 3 of the micro-mirror element 32 including this reinforcing beam 39 and one of the two mirrors 3 adjacent to the mirror 3, and both ends are connected to the outer frames 8. For that reason, by aligning the micro-mirror elements 32 so as to be close to each other, the mirrors 3 can become close to each other in the mirror alignment direction. As a result, according to the present embodiment as well, mirror occupancy of the mirrors 3 rotating around two axes can be enhanced without any limitation in alignment of the micro-mirror elements 32.

In the present embodiment, the reinforcing beam 39 supporting the inner frame 37 so as to be rotatable extends between the mirror 3 of the micro-mirror element 32 and one of the two mirrors 3 adjacent to the mirror 3, and both ends are connected to the outer frames 8. For that reason, the inner frame 27 can be stably supported by the reinforcing beam 39. Furthermore, resistance to the oscillation in the micro-mirror elements 32 can be improved.

In the present embodiment, the inner frame 37 rotates around the reinforcing beam 39 serving as the second axis A2, and is supported at an end on the mirror 3 side, including at least the end on the mirror 3 side or nearby, and at another end on its opposite side, by the reinforcing beam 39 via torsion bars 40, 40. Since one of the torsion bars 40, 40, which support the inner frame 37, is supported in proximity to the center of gravity of the inner frame 37 (micro-mirror element 32), in contrast to a case in which the supporting position is closer to one end, vertical rotation (rotation around an axis extending in a horizontal direction in FIG. 5) can be controlled. Furthermore, the resistance to oscillation in the micro-mirror element 32 can be improved.

It should be noted that in the present embodiment, an example of the reinforcing beam 39 extending in a straight line is explained. However, the reinforcing beam 39 can have a bend portion between the ends connected to the outer frames 8.

In the present embodiment, a structure in which the inner frame 37 is supported by the reinforcing beam 39 at the end on the mirror 3 side and the end on the opposite side is explained. However, as a result of the structure in which the inner frame 37 is supported by the reinforcing beam 39 at least the end on the mirror 3 side or nearby, the inner frame 7 can be stably supported by the reinforcing beam 39 and the resistance to oscillation in the micro-mirror element 32 can be improved.

<Fifth Embodiment>

The present embodiment is the same as the above fourth embodiment except that an inner frame 47 rotates around a part of itself 47c serving as the second axis A2 and there exists a structure relating this. For that reason, the components identical with those in the fourth embodiment are labeled with the same reference numerals in FIG. 6 and detailed descriptions are omitted.

FIG. 6 is a schematic plan view illustrating a micro-mirror array according to the fifth embodiment of the present invention.

In the micro-mirror element 42 of the micro-mirror array illustrated in FIG. 6, the rotary axis 47c (second axis A2) of the inner frame 47 supporting the mirror 3 is connected to a reinforcing beam 49 at an end on the mirror 3 side and to the outer frame 8 at the end on the opposite side via torsion bars 50, 50. These torsion bars 50, 50 extend from the rotary axis 47c in a longitudinal direction of the rotary axis 47c.

The reinforcing beam 49 extends in a straight line between the outer frames 8, and is provided with an axis support unit 49a for supporting one end of the rotary axis 47c of the inner frame 47 via one of the torsion bars 50.

In the above-described embodiment, the reinforcing beam 49 serving as the support unit (the reinforcing beam 49 and the inner frame 47) for supporting the mirror 3 extends between the mirror 3 of the micro-mirror element 42 and one of the two mirrors 3 adjacent to the mirror 3, and both ends are connected to the outer frames 8. For that reason, by aligning the micro-mirror elements 42 so as to be close to each other, the mirrors 3 can become close to each other in the mirror alignment direction. As a result, according to the present embodiment as well, mirror occupancy of the mirrors 3 rotating around two axes can be enhanced without any limitation in alignment of the micro-mirror elements 42.

In the present embodiment, additionally, the inner frame 47 has the rotary axis 47c (second axis A2), having the end on the mirror 3 side supported by the reinforcing beam 49 and the other end supported by the outer frame 8. For that reason, the inner frame 47 can be stably supported by the reinforcing beam 49. Furthermore, the resistance to the oscillation in the micro-mirror elements 42 can be improved.

It should be noted that in the present embodiment, a configuration in which the reinforcing beam 49 supports the rotary axis 47c only at the end on the mirror 3 side is explained. However, by supporting the rotary axis 47c with one or two or more of the torsion bars the outer face, in addition to the end on the mirror 3 side, the inner frame 47 can be further stably supported and resistance to oscillation can be improved.

FIG. 7 is a schematic plan view illustrating a micro-mirror array 41 according to the modification of the fifth embodiment of the present invention.

In this modification, by electrostatic force generated by the inner-frame-side movable electrode 47b and the outer-frame-side fixed electrode 8b operating together, the inner frame 47 is rotatable (swingable) around the rotation axis of the torsion bar 50 (second axis A2).

It should be noted that the outer-frame-side fixed electrode 8b only has to be fixed on the outer frame 8, and therefore, the outer-frame-side fixed electrode 8b can be provided on an outer frame arm (reinforcing beam 49), as in this modification.

<Sixth Embodiment>

The present embodiment is the same as the above fifth embodiment except that a balancer 57d is formed on the inner frame 57 and an outer-frame-side fixed electrode (comb-like electrode) 59c is formed on the reinforcing beam 59 as a driving unit. For that reason, the components identical with those in the fifth embodiment are labeled with the same reference numerals in FIG. 8 and detailed descriptions are omitted.

Figure 8:
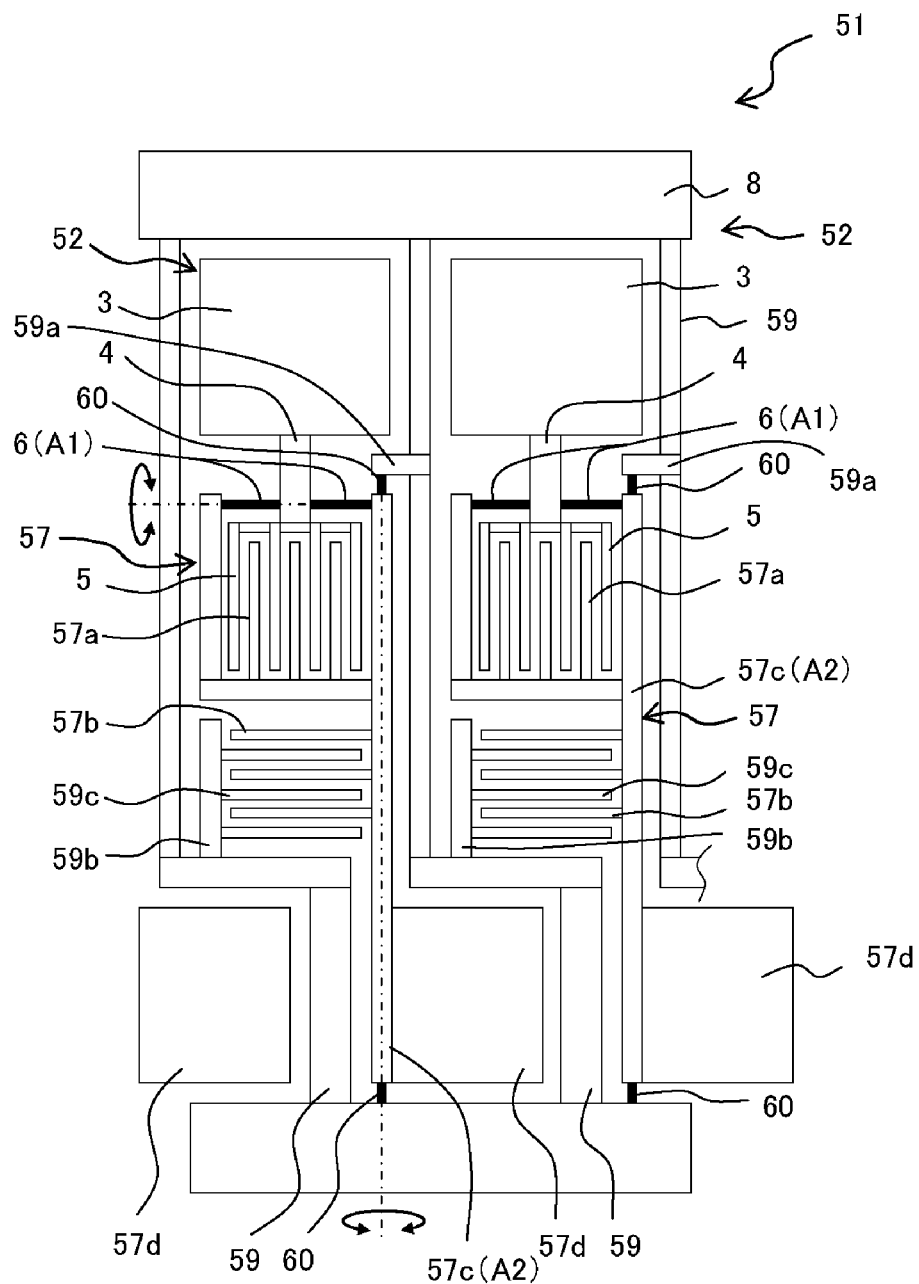
FIG. 8 is a schematic plan view illustrating a micro-mirror array according to the sixth embodiment of the present invention.

FIG. 8 is a schematic plan view illustrating a micro-mirror array according to the sixth embodiment of the present invention.

In the micro-mirror element 52 in the micro-mirror array 51 illustrated in FIG. 8, the rotary axis 57c (second axis A2) of the inner frame 57 supporting the mirror 3 has, similarly to the above fifth embodiment, one end on the mirror 3 side connected to an axis support unit 59a of the reinforcing beam 59 and the other end on the opposite side connected to the outer frame 8 via the torsion bars 60, 60. However, the inner frame 57 of the present embodiment is provided with a balancer 57d at the end on the opposite side from the mirror 3 on the rotary axis 57c.

The balancer 57d is placed so as to maintain the center of gravity of the inner frame 57 and portions rotating with the inner frame 57 (in this embodiment, the mirror 3, the mirror arm 4, the mirror-side movable electrode 5, and the torsion bars 6, 6) as close as possible to the rotary axis 57c of the inner frame 57 in an alignment direction of the mirrors 3.

If the inner frame 57 rotates around the reinforcing beam 59 as the second axis A2 (e.g., the fourth embodiment illustrated in FIG. 5), the balancer is provided on the rotary axis of the reinforcing beam 59 so that the center of gravity is positioned close to the rotary axis of the reinforcing beam 59.

The reinforcing beam 59 extends parallel to the rotary axis 57c (second axis A2) from the end on the mirror 3 side, and bends to extend in a direction receding from the rotary axis 57c (mirror alignment direction) so as to avoid interference from the balancer 57d of the inner frame 57. Afterwards, the reinforcing beam 59 bends again and extends parallel to the rotary axis 57c.

A reinforcing beam arm 59b extends toward the mirror 3 side from a portion of the reinforcing beam 59, which extends to recede from the rotary axis 57c. This reinforcing beam arm 59b has an outer-frame-side fixed electrode (comb-like electrode) 59c to drive the inner frame 57 of the adjacent micro-mirror element 52 disposed so as to face an inner-frame-side movable electrode 57b of the adjacent inner frame 57.

In the above-described embodiment, the reinforcing beam 59 as a support unit (the reinforcing beam 59 and the inner frame 57) for supporting the mirror 3 extend between the mirror 3 of the micro-mirror element 52 including this reinforcing beam 59 and one of the two mirrors 3 adjacent to the mirror 3, and both ends are connected to the outer frames 8. For that reason, by aligning the micro-mirror elements 52 so as to be close to each other, the mirrors 3 can become close to each other in the mirror alignment direction. As a result, according to the present embodiment also, mirror occupancy of the mirrors 3 rotating around two axes can be enhanced without any limitation in alignment of the micro-mirror elements 52.

In the present embodiment, also, the balancer 57d is placed so as to maintain the center of gravity of the inner frame 57 and portions rotating with the inner frame 57 (the mirror 3, the mirror arm 4, the mirror-side movable electrode 5, and the torsion bars 6, 6) as close as possible to the rotary axis 57c of the inner frame 57 in an alignment direction. For that reason, the inner frame 57 can be stably supported. Furthermore, resistance to the oscillation in the micro-mirror elements 52 can be improved.

In the present embodiment, the reinforcing beam 59 includes the outer-frame-side fixed electrode 59b to drive the inner frame 57 of the adjacent micro-mirror element 52. For that reason, the degrees of freedom in the arrangement can be increased; for example, the balancer 57d can be disposed on the end of the rotary axis 57c.

Figure 9:
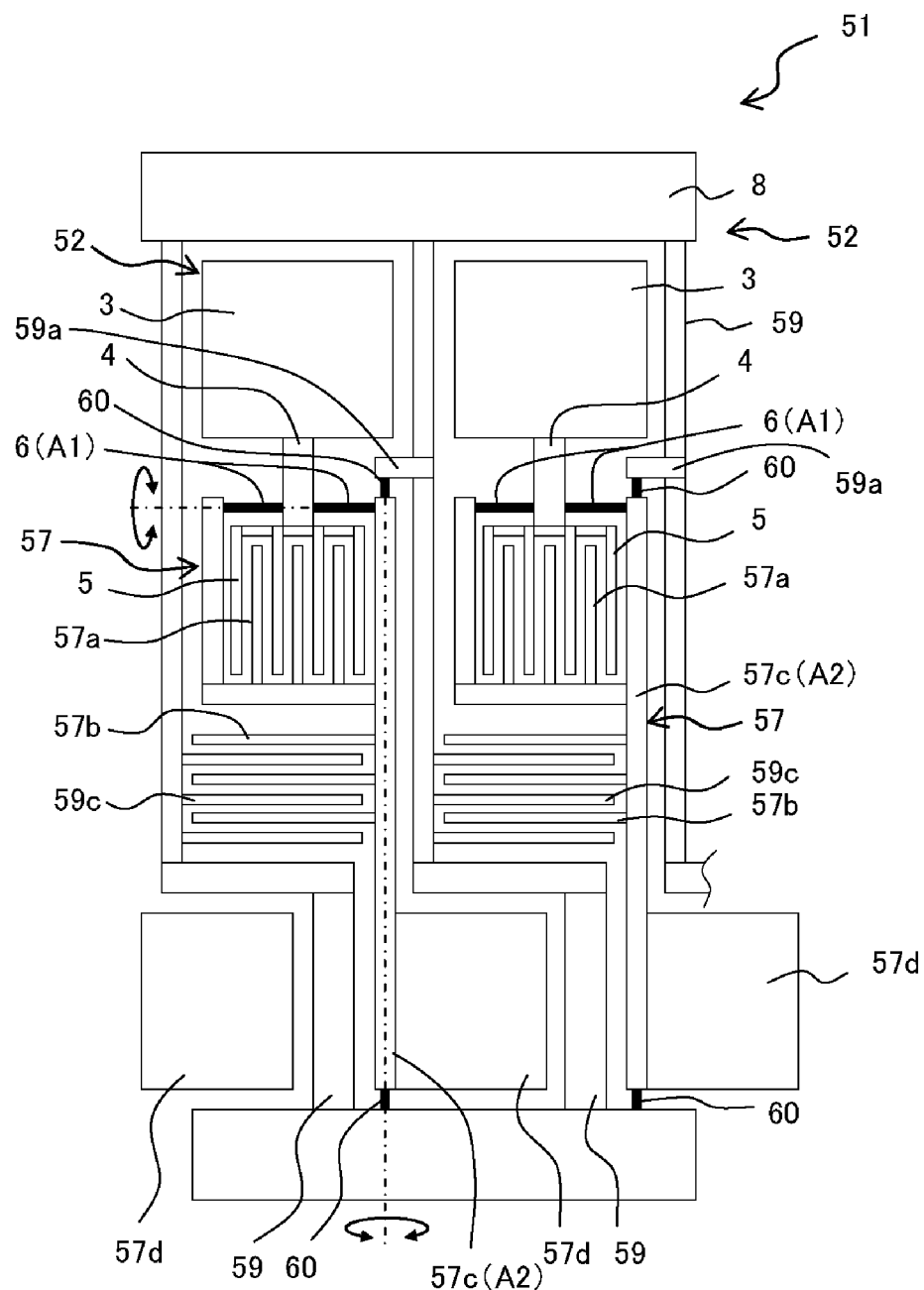
FIG. 9 is a schematic plan view illustrating the micro-mirror array according to a modification of the sixth embodiment of the present invention.

FIG. 9 is a schematic plan view illustrating the micro-mirror array 51 according to a modification of the sixth embodiment of the present invention.

In this modification, via electrostatic force generated by the inner-frame-side movable electrode 57b and the outer-frame-side fixed electrode 59c operating together, the inner frame 57 is rotatable (swingable) around the rotation axis of the torsion bars 60, 60 (second axis A2).

It should be noted that the outer-frame-side fixed electrode 59c only has to be fixed on the outer frame 8, and therefore the outer-frame-side fixed electrode 59c can be provided on an outer frame arm (reinforcing beam 59), as in this modification.

<Seventh Embodiment>

In this embodiment, detailed descriptions are omitted for the configurations similar to those of the above-described first to sixth embodiments. It should be noted that a comparative example in FIG. 10 to FIG. 12 is explained before explaining the present embodiment illustrated in FIG. 13 and FIG. 14.

Figure 10:
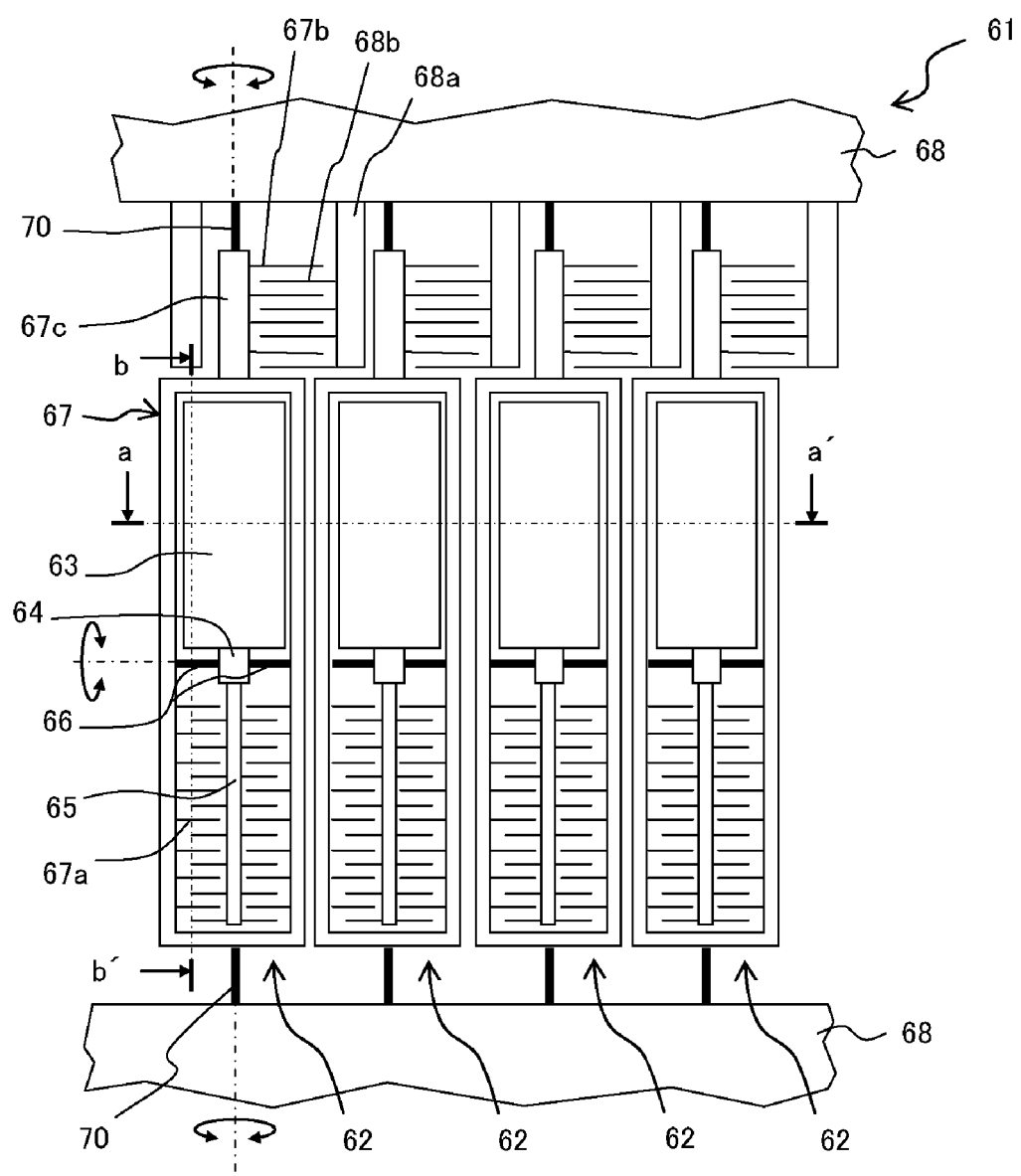
FIG. 10 is a schematic plan view illustrating a micro-mirror array according to a comparative example of the seventh embodiment of the present invention.

FIG. 10 is a schematic plan view illustrating a micro-mirror array 61 according to the comparative example of the seventh embodiment of the present invention.

Figure 11:
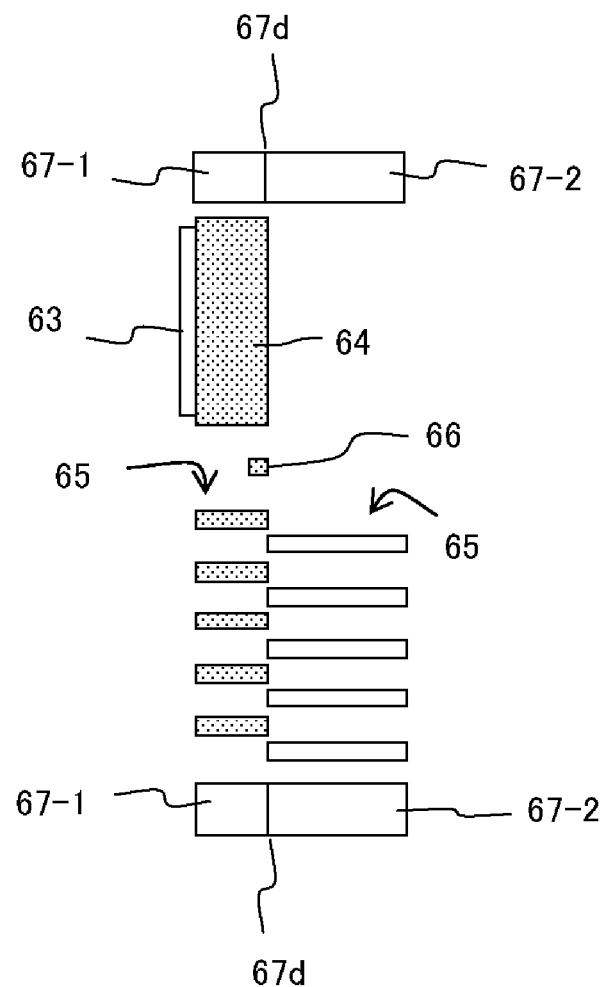
FIG. 11 is a schematic cross-sectional view taken from b-b' of FIG. 10.
Figure 12:
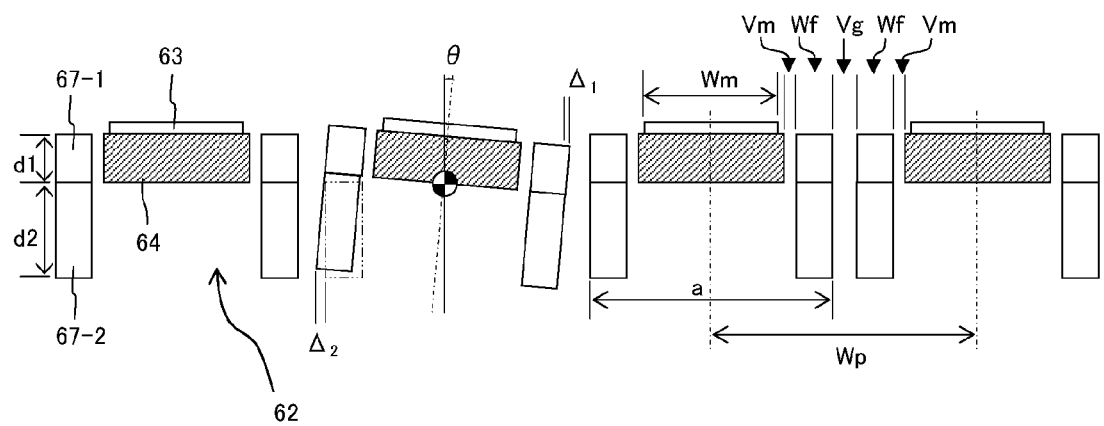
FIG. 12 is a schematic cross-sectional view taken from a-a' of FIG. 10.

FIG. 11 is a schematic cross-sectional view taken from b-b' of FIG. 10, and FIG. 12 is a schematic cross-sectional view taken from a-a' of FIG. 10.

Figure 13:
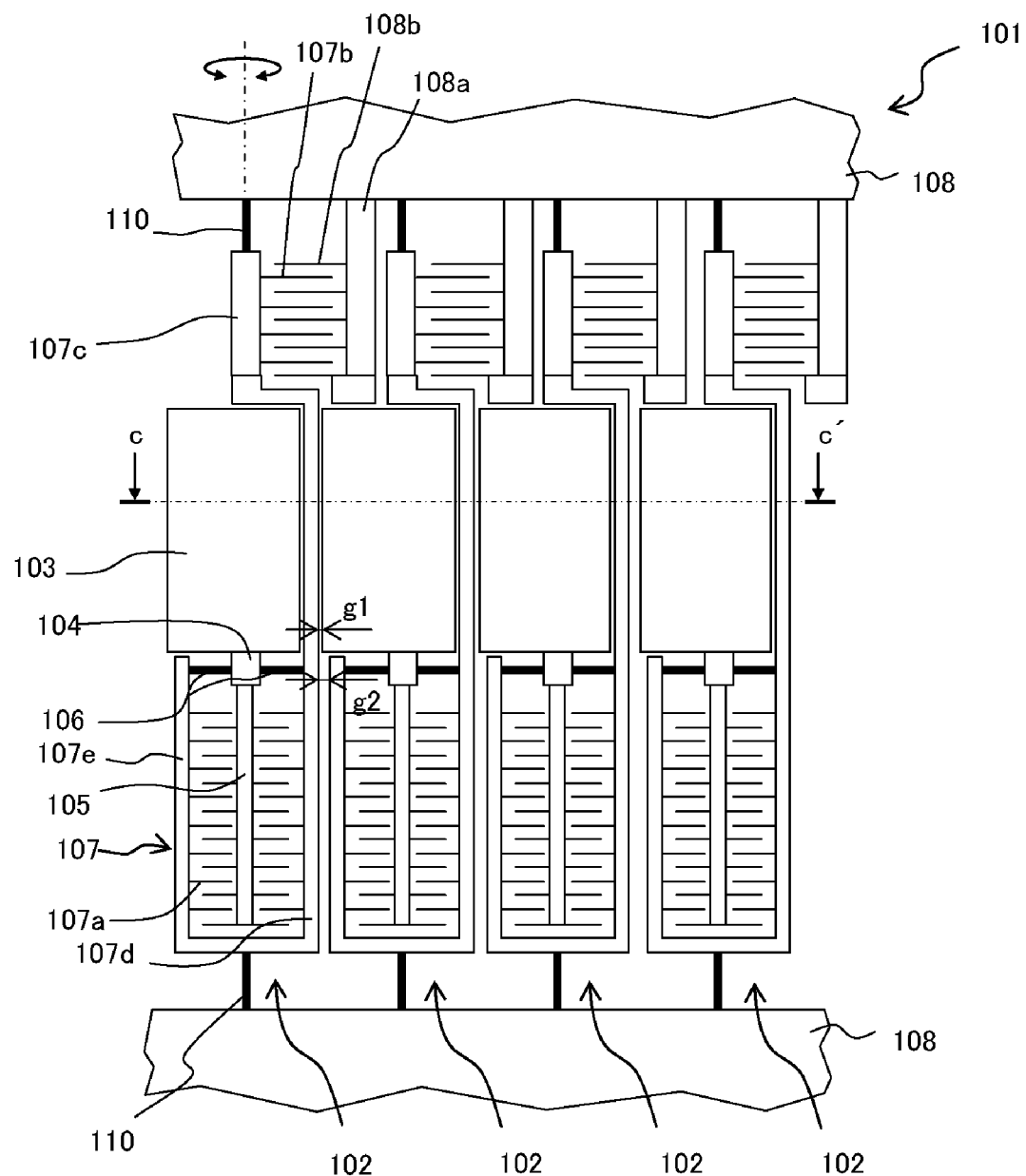
FIG. 13 is a schematic plan view illustrating the micro-mirror array according to the seventh embodiment of the present invention.

FIG. 13 is a schematic plan view illustrating the micro-mirror array 101 according to the seventh embodiment of the present invention.

FIG. 14A is a schematic cross-sectional view taken from c-c' of FIG. 13.

Figure 14C:
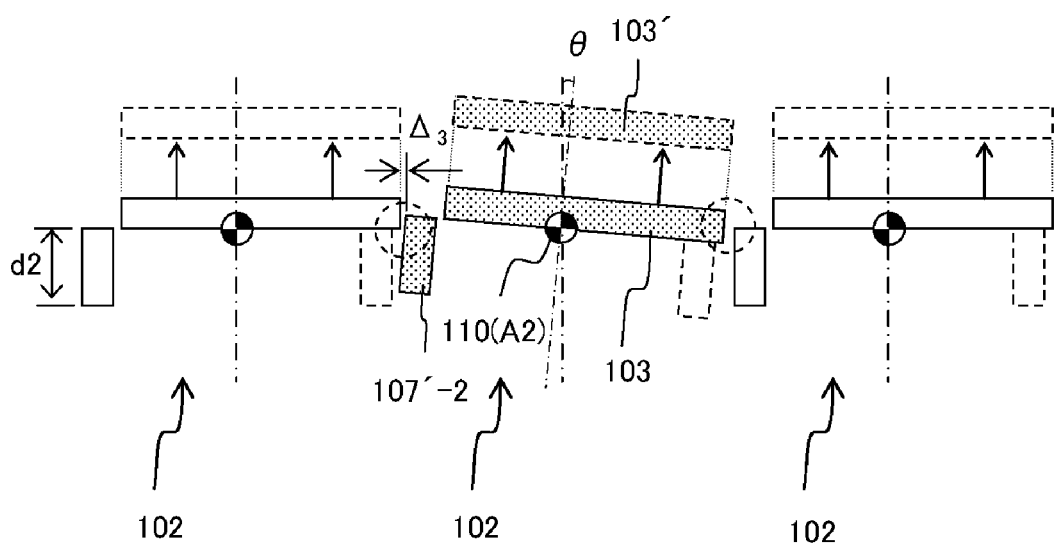
FIG. 14C is a schematic cross-sectional view of the second modification of the seventh embodiment of the present invention.
Figure 14D:
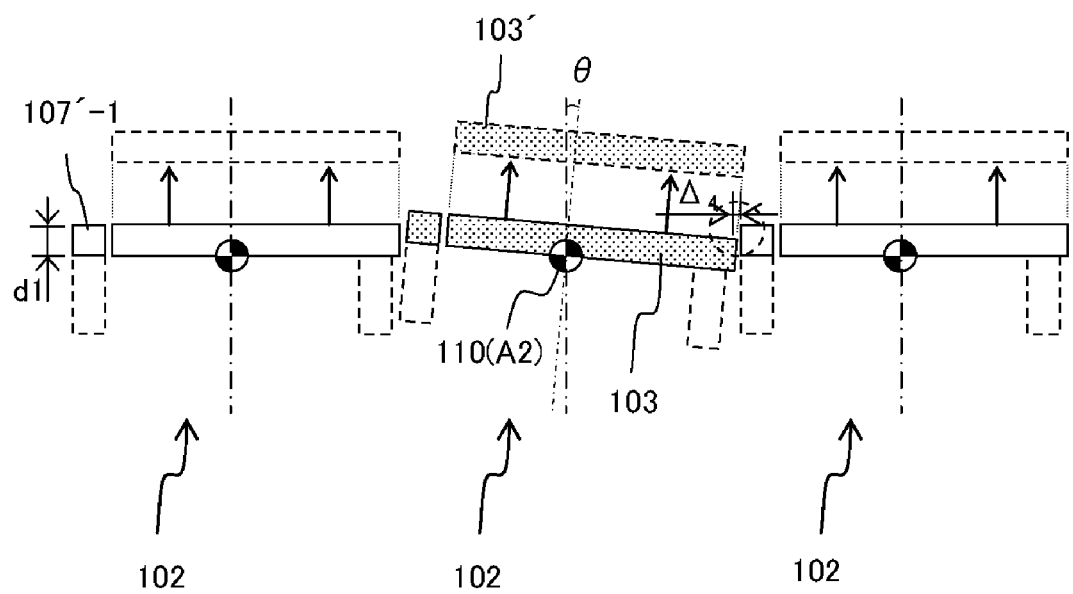
FIG. 14D is a schematic cross-sectional view of the third modification of the seventh embodiment of the present invention.

FIG. 14B to FIG. 14D are schematic cross-sectional views according to the first to third modifications of the present embodiment.

Figure 24:
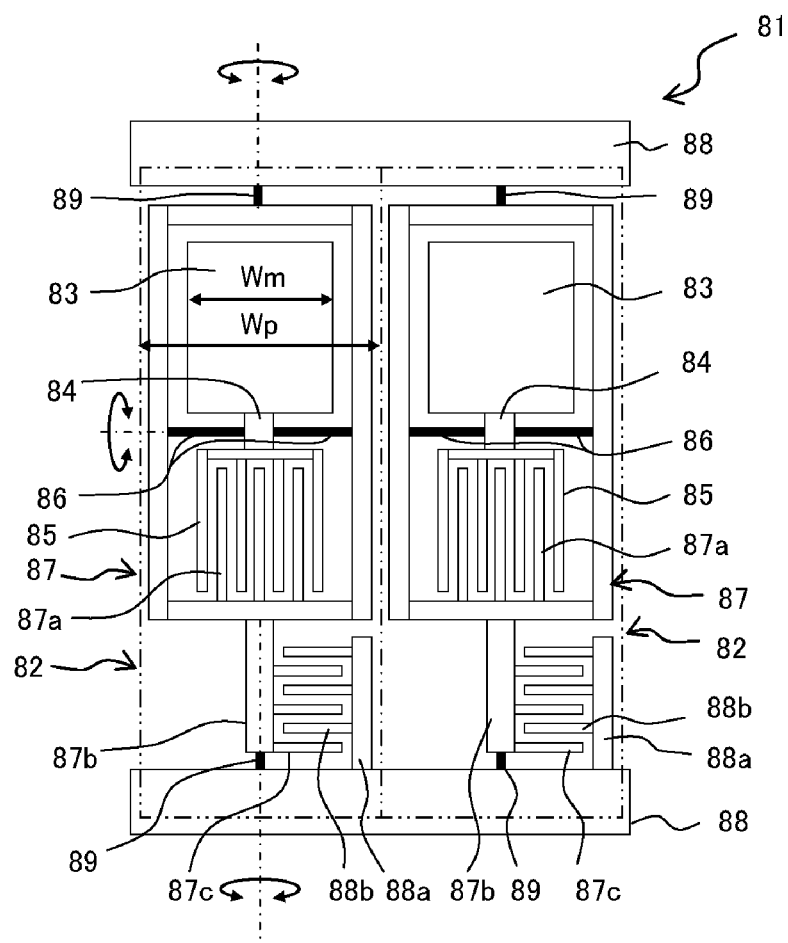
FIG. 24 is an overview plan view illustrating a related micro-mirror array.

First, the micro-mirror array 61 according to the comparative example illustrated in FIG. 10 is explained. Similarly to the related micro-mirror array 81 illustrated in FIG. 24, an inner frame 67 of the micro-mirror array 61 is disposed so as to cover a mirror 63 and a mirror-side movable electrode 65.

In FIG. 10, a micro-mirror array 61 has a number of micro-mirror elements 62 arranged in one direction. A mirror 63 in each of the micro-mirror elements 62 is coupled to a mirror-side movable electrode (comb-like electrode) 65 via a mirror arm 64. The mirror 63 is supported by an inner frame 67 via a pair of torsion bars 66, 66 in the mirror arm 64, and is rotatable (swingable) around a rotation axis of the torsion bars 66, 66.

The inner frame 67 is disposed so as to cover the mirror 63 and the mirror-side movable electrode 65, and has a mirror-side fixed electrode (comb-like electrode) 67a placed opposite to the mirror-side movable electrode 65. Via electrostatic force generated by the mirror-side movable electrode 65 and the mirror side fixed electrode 67a operating together, the mirror 63 connected to the mirror arm 64 is rotatable (swingable) around the rotation axis of the torsion bars 66, 66 together with the mirror arm 64 and the mirror-side movable electrode 65.

An inner frame arm 67c is provided at an end on the mirror 63 side in the inner frame 67, and an inner-frame-side movable electrode (comb-like electrode) 67b is provided on the side surface of the inner frame arm 67c. On an outer frame arm 68a, an end of which is fixed on an outer frame 68, an outer-frame-side fixed electrode (comb-like electrode) 68b is provided. The inner-frame-side movable electrode 67b and the outer-frame-side fixed electrode 68b are placed opposite to each other. The inner frame 67 is supported by the outer frame 68 so as to be rotatable around torsion bars 70, 70, with one side being connected to the inner frame arm 67c.

With the electrostatic force generated by operating the inner-frame-side movable electrode 67b and the outer-frame-side fixed electrode 68b together, the inner frame 67 is rotatable (swingable) around a rotation axis of the torsion bars 70, 70.

It should be noted that, as illustrated in FIG. 11, the inner frame 67 in this comparative example is a double-layered SOI (Silicon On Insulator) substrate, and has $SiO_2$ (reference code 67d) and two layers of Si (67-1, 67-2) sandwiching the $SiO_2$. As FIG. 11 illustrates, the mirror 63 of metal films, for example, is supported at its back surface by the mirror arm 64.

In the meantime, as illustrated in FIG. 12, the inner frame 67 extends between the mirror 63 covered by the inner frame 67 and both of the two mirrors 63 adjacent to the mirror 63. For that reason, two inner frames 67 exist between the mirrors 63, 63 adjacent to each other.

In addition, mirror occupancy is limited because of three gaps (Vm, Vg, Vm) which are present between the mirror 63 and the inner frame 67, between the inner frames 67, and between the adjacent mirror 63 and the inner frame 67, respectively, in addition to two widths Wf, Wf of the inner frame 67.

In particular, the frame gap Vg between the adjacent micro-mirror elements 62 is made while taking into account margins ($\Delta_1$, $\Delta_2$) to avoid contacting the adjacent micro-mirror element 62 when one of the micro-mirror elements 62 is rotated around the rotation axis of the torsion bars 70, 70.

The micro-mirror element 62, second from left in FIG. 12, shows the state in which a micro-mirror element 62 is rotated, and with this rotation, the distance from the adjacent inner frame 67 becomes closer by $\Delta_1$ at the upper right side and also becomes closer by $\Delta_2$ at the lower left side compared with the position before the rotation. When the total width of the inner frame 67 is a, the rotation angle of the mirror 63 is θ, and the thicknesses of the upper layer side 67-1 and the lower layer side 67-2 of the inner frame 67, which is an SOI substrate, are d1 and d2, respectively, an amount of margin indicated by the following equations (1) and (2) is needed.

$$\Delta_1 = a/2 * (\cos\theta - 1) + d1 * \sin\theta \qquad \text{equation (1)}$$

$$\Delta_2 = a/2 * (\cos\theta - 1) + d2 * \sin\theta \qquad \text{equation (2)}$$

When the micro-mirror array 61 with a mirror pitch Wp of 260 μm and a rotation angle θ of 5° is created by using an SOI substrate with a thickness of 200 μm, for example, gaps of Vg=18 μm, Vm=6 μm, Wf=15 μm are needed, and the occupancy of the mirror 63 results in approximately 75%.

The most preferred occupancy of the mirror 63 is approximately 90%. However, the micro-mirror array 61 according to the comparative example illustrated in FIG. 10 to FIG. 12 impairs light-use efficiency. It should be noted that when the occupancy of the mirror 63 is too high, signal cross-talk occurs between the adjacent wavelengths, and for that reason, occupancy of approximately 90% is preferred.

When optical signals are divided into smaller wavelength bands for greater capacity in the future, the pitch width Wp of the micro-mirror element 62 of the micro-mirror array 61 is preferably smaller. At that time, it is difficult to make the width of the gaps and the width of the inner frames 67 smaller and therefore the width of the mirror 62 has to be smaller. For that reason, the occupancy is significantly decreased and loss of signal light is increased as a result.

In the present embodiment, similarly to the above-described first to sixth embodiments, an inner frame 107 serving as a support unit extends between a mirror 103 of the micro-mirror element 102 including the inner frame 107 and one of the two mirrors 103 adjacent to the mirror 103, and both ends are connected to the outer frames 108. Additionally, in the present embodiment, although the details are explained later, one or more layers of the inner frame 107 are missing so that the mirror occupancy is further enhanced.

A micro-mirror array 101 illustrated in FIG. 13 has micro-mirror elements 102 aligned in one direction (a horizontal direction in FIG. 13). Each of micro-mirror elements 102 includes a mirror 103 rotating around two axes, and an inner frame 107 connected to an outer frame 108 and serving as a support unit for supporting the mirror 103.

The mirror 3 is connected to the mirror-side movable electrode (comb-like electrode) 105 via the mirror arm 104. The inner frame 107 is provided with a mirror-side fixed electrode (comb-like electrode 107a) facing the mirror-side movable electrode 105. Via electrostatic force generated by the mirror-side movable electrode 105 and the mirror side fixed electrode 107a operating together, which serve as a drive unit, the mirror 103 connected to the mirror arm 104 is rotatable (swingable) around the rotation axis of the torsion bars 106, 106 together with the mirror arm 104 and the mirror-side movable electrode 105.

The inner frame 107 extends so as to enclose the mirror-side movable electrode 105 and the mirror-side fixed electrode 107a, which serve as a driving unit of the mirror 103, and is formed to surround the mirror-side movable electrode 105 and the mirror-side fixed electrode 107a as well as the mirror 103.

The inner frame 107, in addition, supports the mirror arm 104 via a pair of the above torsion bars 106, 106 using a straight portion 107d extending between the mirrors 103 and a portion 107e enclosing the mirror-side movable electrode 105.

An inner frame arm 107c is provided at an end on the mirror 103 side of the inner frame 107, and an inner-frame-side movable electrode (comb-like electrode) 107b is provided on the side surface of the inner frame arm 107c. On an outer frame arm 108a, an end of which is fixed on an outer frame 108, an outer frame fixed electrode (comb-like electrode) 108b is provided. The inner-frame-side movable electrode 107b and the outer-frame-side fixed electrode 108b are placed opposite to each other. The inner frame 107 is supported by the outer frame 108 so as to be rotatable around torsion bar 110, with one side being connected to the inner frame arm 107c.

Via electrostatic force generated by the inner-frame-side movable electrode 107b and the outer-frame-side fixed electrode 108b operating together, the inner frame 107 is rotatable (swingable) around the rotation axis of the torsion bars 110, 110.

As described above, the mirror 103 can perform rotary motions around two axes: a rotary motion around the rotation axis of the torsion bars 106, 106, and a rotary motion around the rotation axis of the torsion bars 110, 110.

It should be noted that a gap g1 between the mirror 103 of the present embodiment and the adjacent inner frame 107 is smaller than a gap g2 between the portion 107e, which encloses the driving unit, of the inner frame 107 supporting the mirror 103 and the inner frame 107 (more specifically its straight portion 107d) that is adjacent to the enclosing portion 107e.

As illustrated in FIG. 14A, which is a schematic cross-sectional view taken from c-c' of FIG. 13, the inner frame 107 extends between the mirror 103 supported by the inner frame 107 and the adjacent mirror 103 located on a side of the mirror 103 that rotates toward the back surface of the mirror 103 when the mirror 103 rotates around the second axis (torsion bars 110, 110), that is, a side that moves downward with respect to the center area of the mirror 103 (the right side in FIG. 14A).

The inner frame 107 is a double-layered SOI substrate, and is formed from two layers of Si (107-1, 107-2) sandwiching $SiO_2$ (reference code 107d). It should be noted that although the inner frame 107 partially lacks the Si layer 107-1 on the mirror front side in the example of FIG. 14A, the inner frame 107 is disposed from the reflective surface area of the mirror 103 to the mirror back surface side.

Because the Si layer 107-1 is missing after being removed by means of etching, the inner frame 107 is formed from the Si layer 107-2 on the back surface of the mirror 103 (the lower side in FIG. 14A) at least in the portion extending between the mirrors 103, 103. It should be noted that the mirrors 103' illustrated with broken lines indicate positions of the mirrors 103 rotated around the torsion bar 106 illustrated in FIG. 13.

According to the above-described structure, in the micro-mirror element 102 illustrated in FIG. 14A, compared with the micro-mirror element 62 of the comparative example illustrated in FIG. 10, the inner frame 107 extends along one side of the mirror 103 so that one frame width Wf can be omitted. As illustrated in FIG. 12, a gap Vm between the omitted frame and its adjacent mirror 103 and the above margin $\Delta_2$ can also be omitted. Furthermore, the removal of the Si layer 107-1 on the mirror front surface allows for omission of the margin $\Delta_1$.

For example, under conditions such that the thicknesses d1, d2 of the Si layers 107-1, 107-2 (see FIG. 14B) are 60 μm and 140 μm, respectively, the total width of the inner frame a=240 μm, and θ=5°, it is possible to expand the mirror width Wm to approximately 230 μm when the mirror pitch Wp is 260 μm so that an approximately 89% mirror occupancy can be realized.

Next, in the first modification illustrated in FIG. 14B, because the Si layer 107-2 on the mirror back surface side is missing after its removal, the inner frame 107 is formed from the Si layer 107-1 on the mirror front side (the upper side in FIG. 14B) at least in the portion extending between the mirrors 103, 103.

In such a case, although the above margin $\Delta_1$ is maintained, similarly to the micro-mirror element 102 illustrated in FIG. 14A, one frame width Wf, the gap Vm and the margin $\Delta_2$ can be omitted.

In a case of the second modification illustrated in FIG. 14C, the inner frame 107' extends between the mirror 10-3 supported by the inner frame 107' and the adjacent mirror 103 on a side of the mirror 103 that moves up toward the mirror front side when the mirror 103 rotates around the second axis (torsion bars 110, 110) (the left side in FIG. 14C).

In addition, because the Si layer 107'-1 is missing after being removed by means of etching, the inner frame 107' is formed from the Si layer 107'-2 on the back surface of the mirror (the lower side in FIG. 14C) at least in the portion extending between the mirrors 103, 103.

According to the above-described structure, in the micro-mirror element 102' illustrated in FIG. 14C, compared with the micro-mirror element 62 of the comparative example illustrated in FIG. 10, the inner frame 107' extends along with one side of the mirror 103 so that one frame width Wf can be omitted. As illustrated in FIG. 12, a gap Vm between the omitted frame and its adjacent mirror 103 and the above margin $\Delta_2$ can also be omitted. Furthermore, the removal of the Si layer 107-1 on the mirror front surface allows for omission of the margin $\Delta_1$.

However, a margin $\Delta_3$ indicated in the following equation (3) is maintained as a margin between the Si layer 107'-2 on the back surface side of the mirror and the mirror 103.

$$\Delta_3 = a*(1/\cos\theta - 1) \qquad \text{equation (3)}$$

In the third modification illustrated in FIG. 14D, because the Si layer 107-2 on the mirror back surface side is missing after its removal, the inner frame 107' is formed from the Si layer 107'-1 on the mirror front side (the upper side in FIG. 14D) at least in the portion extending between the mirrors 103, 103.

In such a case, similarly to the example illustrated in FIG. 14A, one frame width Wf, the gap Vm, and margins $\Delta_1$, $\Delta_2$ can be omitted.

However, a margin $\Delta_4$ indicated in the following equation (4) is maintained as a margin between the operational range of the rotation of the mirrors 103, 103' around the rotation axis of the torsion bar 106 (first axis A1) and the Si layer 107'-1 on the mirror front side.

$$\Delta_4 = a/2 * \cos\theta(\cos\theta - 1) + d_1 * \sin\theta \qquad \text{equation (4)}$$

As described above, the inner frame 107 serving as a support unit extends between a mirror 1033 of the micro-mirror element 102 including the inner frame 107 and one of the two mirrors 103 adjacent to the mirror 103, and a part of the inner frame 107 is missing. As a result, as described above, the gap g1 between the mirror 103 and the adjacent inner frame 107 becomes effectively smaller than the gap g2 between the enclosing portion 107e, which encloses the driving unit, of the inner frame 107 supporting the mirror 103 and the inner frame 107 (more specifically its straight portion 107d) that is adjacent to the enclosing portion 107e.

In the above-described seventh embodiment, the inner frame 107 serving as a support unit for the mirror 103 extends between the mirror 103 of the micro-mirror element 102 including the inner frame 107 and one of the two mirrors 103 adjacent to the mirror 103, and both ends are connected to the outer frames 108. For that reason, by aligning the micro-mirror elements 102 so as to be close to each other, the mirrors 103 can become close to each other in the mirror alignment direction. As a result, according to the present embodiment, mirror occupancy of the mirrors 103 rotating around two axes can be enhanced without any limitation in alignment of the micro-mirror elements 102.

In the present embodiment, also, as illustrated in FIG. 14A and FIG. 14B, the inner frame 107 extends between the mirror 103 supported by the inner frame 107 and the adjacent mirror 103 on a side located on a side of the mirror 103 that rotates toward the back surface of the mirror 103 when the mirror 103 rotates around the second axis (torsion bar 110). Therefore, the mirror occupancy is further enhanced.

In the present embodiment, in addition, as illustrated in FIG. 14A to FIG. 14D, the inner frame 107 is formed from two or more layers 107-1, 107-2, and one or more layer (one layer in the present embodiment) is missing in at least a portion extending between the mirrors 103. For that reason, the mirror occupancy can be enhanced.

In the present embodiment, also, as illustrated in FIG. 14A and FIG. 14C, the inner frame 107 is formed so that the layer 107-1 on the mirror front side is missing at least in the portion extending between the mirrors 103. Therefore, the mirror occupancy is further enhanced.

Furthermore, as illustrated in FIG. 14A, when the inner frame 107 extends between the mirror 103 supported by the inner frame 107 and the adjacent mirror 103 on a side located on a side of the mirror 103 that rotates toward the back surface of the mirror 103 when the mirror 103 rotates around the second axis (torsion bar 110), and the layer 107-1 on the mirror front side is missing, the frame width Wf, the gap Vm, and the margins $\Delta_1$, $\Delta_2$ of the comparative example illustrated in FIG. 10 to FIG. 12 can be omitted. Therefore, the mirror occupancy can be further effectively enhanced.

In the present embodiment, also, as illustrated in FIG. 13 and other drawings, the gap g1 between the mirror 103 and the adjacent inner frame 107 is smaller than a gap g2 between the portion 107e, which encloses the driving unit, of the inner frame 107 supporting the mirror 103 and the inner frame 107 (more specifically its straight portion 107d) that is adjacent to the enclosing portion 107e. Accordingly, the mirror occupancy can be further enhanced.

It should be noted that in the present embodiment, the inner frame 107 formed from two or more layers is explained with an example of a double-layered SOI substrate. However, the inner frame 107 can be formed from three or more layers or from other materials.

<Eighth Embodiment>

The present embodiment is mostly the same as the above-described seventh embodiment except that a stress relaxation mechanism 119 as the third connection is disposed. For that reason, the same reference codes are assigned to the identical or similar components in the seventh embodiment, and detailed descriptions are omitted.

Figure 15A:
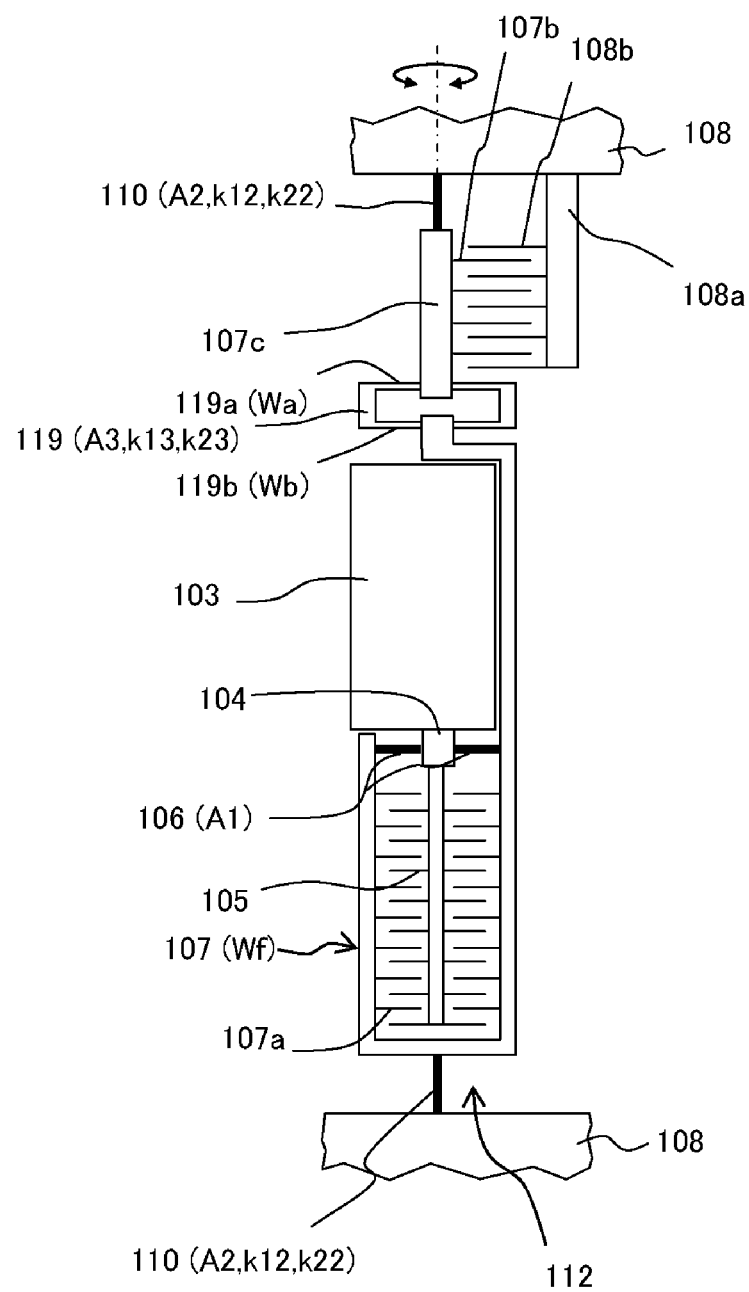
FIG. 15A is a schematic plan view illustrating the micro-mirror element according to the eighth embodiment of the present invention.

FIG. 15A is a schematic plan view illustrating the micro-mirror element 112 according to the eighth embodiment of the present invention.

Figure 15B:
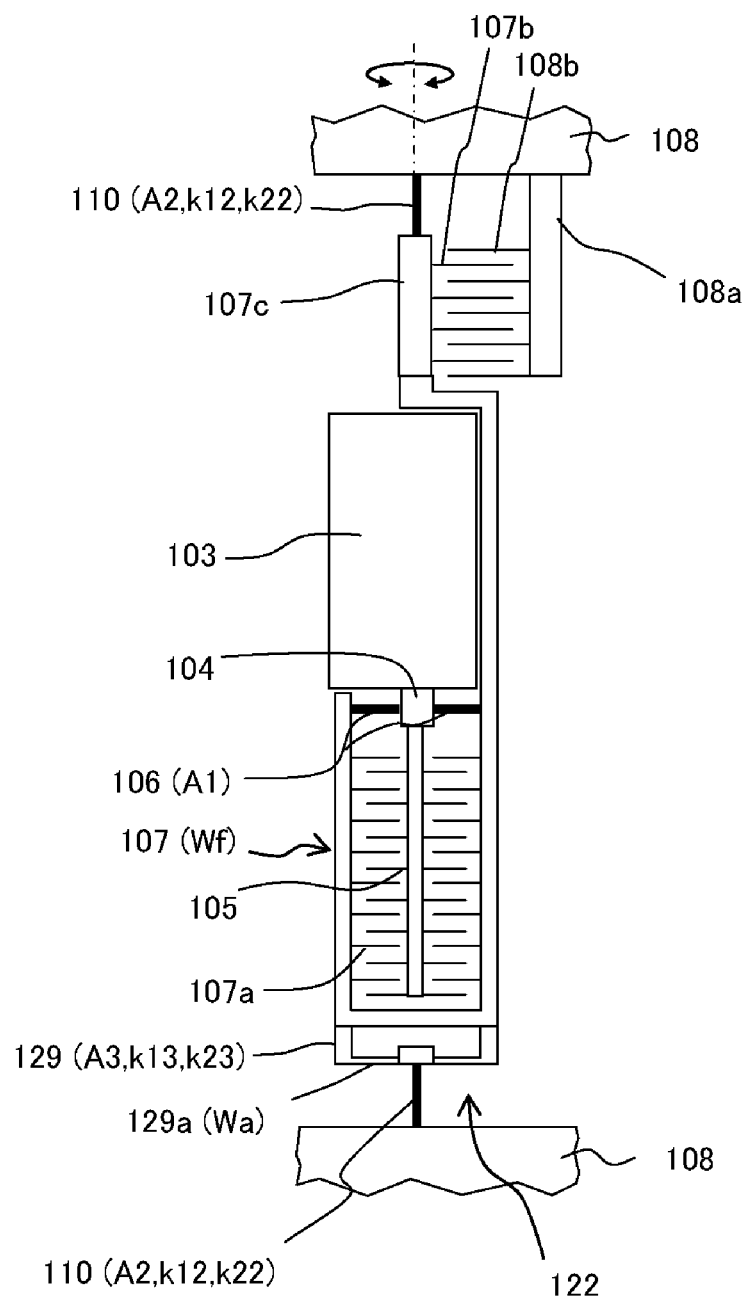
FIG. 15B is a schematic plan view illustrating a micro-mirror element according to the first modification of the eighth embodiment of the present invention.

FIG. 15B and FIG. 15C are schematic plan views illustrating micro-mirror elements 122, 132 according to the first and second modifications of the present embodiment.

Figure 16:
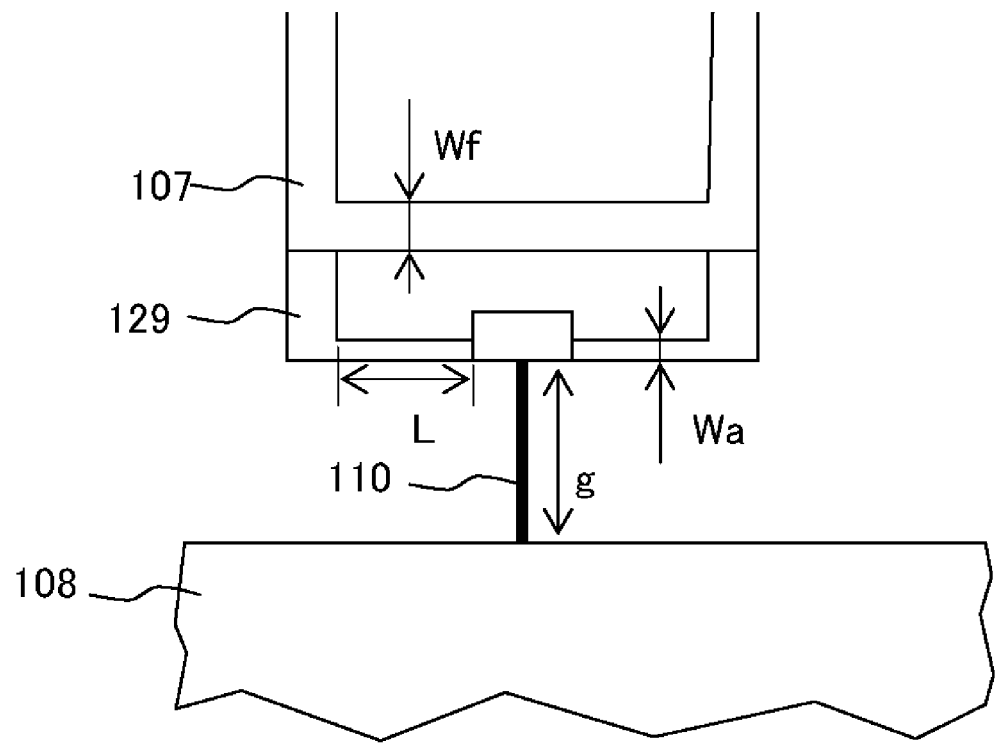
FIG. 16 is a partially enlarged view of FIG. 15B.

FIG. 16 is a partially enlarged view of FIG. 15B.

Figure 17:
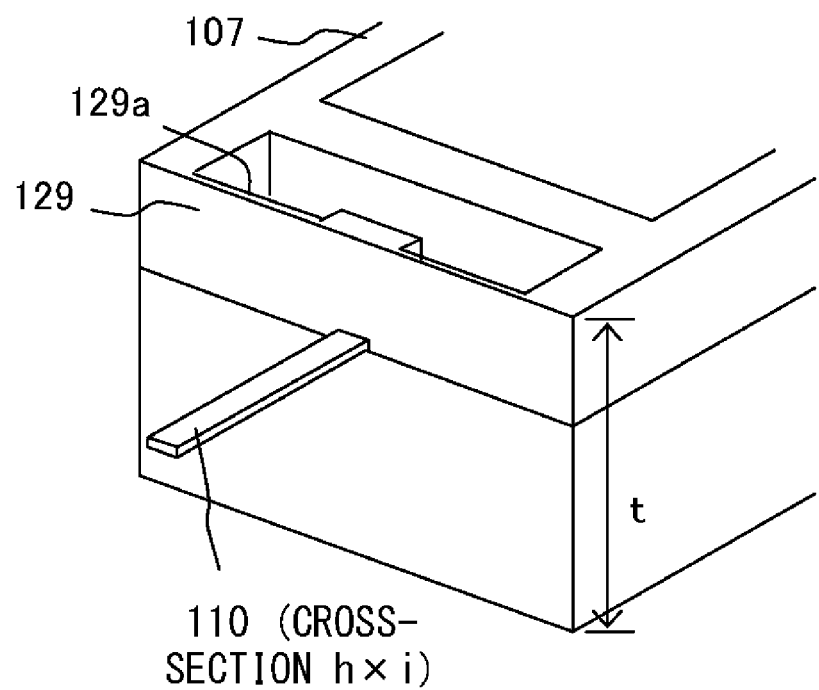
FIG. 17 is a partially enlarged perspective view of FIG. 15B.

FIG. 17 is a partially enlarged perspective view of FIG. 15B.

The micro-mirror element 112 has the stress relaxation mechanism 119 as the third connection integrated with the inner frame 107, for example, and disposed inside the inner frame 107, or more specifically disposed between the inner frame arm 107c and the main body of the inner frame 107 (a portion other than the inner frame arm 107c). It should be noted that the micro-mirror element 112 of the present embodiment also has a torsion bar (first connection) 106 that serves as the first axis A1 connecting the mirror 103 to the inner frame 107 in a rotatable manner.

The stress relaxation mechanism 119 has a rectangular frame shape in the planar view. The stress relaxation mechanism 119 has thin-wall surfaces 119a, 119b orthogonal to the torsion bar (second connection) 110 serving as the second axis A2. At the centers of these thin-wall surfaces 119a, 119b, the stress relaxation mechanism 119 is connected to the inner frame arm 107c and the main body.

The thicknesses Wa, Wb of the thin-wall surfaces 119a, 119b, respectively, are preferably less than a half of the width Wf of the inner frame 107, for example. It should be noted that in the thin-wall surfaces 119a, 119b, the portions connected to the inner frame arm 107c and the main body should increase in their thickness in part or should have the inner frame 107 penetrating the portion to ensure strength against a concentrated load.

The surfaces other than the thin-wall surfaces 119a, 119b in the stress relaxation mechanism 119 are surfaces parallel to the torsion bar 110. The thickness of the surfaces can be the same as the width Wf of the inner frame 107, for example, as long as the strength can be ensured.

A spring constant $k_{12}$ of the torsion bar 110 and a spring constant $k_{13}$ of the stress relaxation mechanism 119 in response to displacement in a direction parallel to the torsion bar 110 are in the relationship $k_{13} < k_{12}$.

A spring constant $k_{22}$ of the torsion bar 110 and a spring constant $k_{123}$ of the stress relaxation mechanism 119 in response to displacement in a direction of rotation around the rotation axis of the torsion bar 110 are in the relationship $k_{23} \geq k_{22}$.

As described above, the stress relaxation mechanism 119 absorbs the stress components in a stretching or compressing direction parallel to the torsion bar 110.

In the micro-mirror element 122 according to the first modification of FIG. 15B, the stress relaxation mechanism 129 serving as the third connection is integrated with the inner frame 107 and the torsion bar 110 for example and is disposed between the inner frame 107 and the torsion bar (second connection) 110, or more specifically is disposed between the end on the side opposite to the end where the inner frame arm 107c of the inner frame 107 is provided and the torsion bar 110.

The stress relaxation mechanism 129 has a U-shape in the planar view. The stress relaxation mechanism 129 has a thin-walled surface 129a orthogonal to the torsion bar 110. At the center of this thin-walled surface 129a, the stress relaxation mechanism 129 is connected to the torsion bar 110. The stress relaxation mechanism 129 is connected to the inner frame 107 at two surfaces other than the thin-walled surface 129a of the stress relaxation mechanism 129, which are parallel to the torsion bar 110.

The thickness Wa in a direction parallel to the torsion bar 110 of the thin-walled surface 129a is preferably half the width Wf of the inner frame 107 or less, for example. It should be noted that in the thin-walled surface 129a, the portion connected to the torsion bar 110 should partially increase in its thickness, for example, to ensure strength against a concentrated load.

The surfaces other than the thin-walled surface 129a in the stress relaxation mechanism 129 are parallel to the torsion bar 110. The thickness of these surfaces can be the same as the width Wf of the inner frame 107, for example, so as to ensure strength.

In this modification, the spring constant $k_{12}$ of the torsion bar 110 and the spring constant $k_{13}$ of the stress relaxation mechanism 129 in response to displacement in a direction parallel to the torsion bar 110 are in the relationship $k_{13} < k_{12}$, and the spring constant $k_{22}$ of the torsion bar 110 and the spring constant $k_{23}$ of the stress relaxation mechanism 129 in response to displacement in a direction of rotation around the rotation axis of the torsion bar 110 are in the relationship $k_{23} \geq k_{22}$.

As described above, the stress relaxation mechanism 129 absorbs the stress components in a stretching or compressing direction parallel to the torsion bar 110.

Here, an example of the stress relaxation mechanism (third connection) is explained with reference to FIG. 16 and FIG. 17, taking the stress relaxation mechanism 129 as an example.

When the micro-mirror element 122 illustrated in FIG. 15B is manufactured by selectively etching a uniform substrate, for example, the inner frame 107, the torsion bar 110, the stress relaxation mechanism 129 and other components are formed from the same material (e.g. Si), and the mechanical strength in each portion is adjusted depending on the width of patterns or differences in the thickness in each portion. When the same material is used, the strength of a rigid body is approximately proportional to the cube of the size. If the thickness Wa of the thin-wall surface 129a of the stress relaxation mechanism 129 is doubled from 5 μm to 10 μm, the strength is increased by eight times.

Since the inner frame 107 is suspended by the torsion bars 110, 110, the stress acting on the inner frame 107 is stress in a stretching direction and rotation torque around the rotation axis of the torsion bars 110, 110.

By providing the stress relaxation mechanism 129 satisfying the above-described relationship of the spring constants, the stress in the stretching direction is reduced and therefore the force acting on the inner frame 107 is not very large. Accordingly, when the thin-walled unit 129a is 5 μm thick, a sufficient strength can be obtained if a pattern width of the inner frame 107 is approximately 10 μm, which is approximately double the thickness of the thin-walled unit 129a.

Here, as illustrated in FIG. 16 and FIG. 17, when the length in a planar view of one surface of the two portions of the thin-walled surface 129a located sandwiching the connection to the torsion bar 110 is L, the depth is t, and the thickness is Wa, the length of the torsion bar 110 is f, the cross-section is h×i, and Young's modulus is E, an approximate solution derived from a simplified model of the spring constant $k_{12}$ of the above torsion bar 110 and the spring constant $k_{13}$ of the stress relaxation mechanism 129 in response to displacement in a direction parallel to the torsion bar 110 is obtained from the following equations (5) and (6).

$$k_{12}=hiE/g \qquad \text{equation (5)}$$

$$k_{13}=tWa_3E/(2L_3) \qquad \text{equation (6)}$$

When a ratio of the spring constant $k_{12}$, $k_{13}$ is obtained when the size of the stress relaxation mechanism 129 is L=90 μm, Wa=5 μm, t=200 μm, and the size of the torsion bar 110 is g=100 μm, h=5 μm, i=20 μm, the ratio is approximately 1 to 58 and $k_{12}$ is greater. In addition, because the stress relaxation mechanism 129 and the torsion bar 110 are connected in series, most of the stress from the outer frame 108 is absorbed by the stress relaxation mechanism 129, and the stress acting on the torsion bar 110 and others is significantly reduced.

A micro-mirror element 132 according to the second modification in FIG. 15C has a stress relaxation mechanism 139 serving as the third connection integrated with the outer frame 108, for example, and it is disposed between the torsion bar 110 (second connection) and the outer frame 108, or more specifically between the torsion bar 110 directly connected to the main body of the inner frame arm 107 and the outer frame 108.

The stress relaxation mechanism 139 has a hollow portion 139b provided in the outer frame 108 and a thin-walled surface 139a located so as to cover the hollow-portion 139b. At the center of the thin-walled surface 139a, the stress relaxation mechanism 139 is connected to the torsion bar 110.

The thickness Wa of the thin-walled surface 139a is preferably half the width Wf of the inner frame 107 or less, for example. It should be noted that a portion of the thin-walled surface 139a, which is connected to the torsion bar 110, should partially increase in thickness, for example, to ensure strength against a concentrated load.

In this modification, also, the spring constant $k_{12}$ of the torsion bar 110 and the spring constant $k_{13}$ of the stress relaxation mechanism 139 in response to displacement in a direction parallel to the torsion bar 110 are in the relationship $k_{13} < k_{12}$, and the spring constant $k_{22}$ of the torsion bar 110 and the spring constant $k_{23}$ of the stress relaxation mechanism 139 in response to displacement in a direction of rotation around the rotation axis of the torsion bar 110 are in the relationship $k_{23} \geq k_{22}$.

As described above, the stress relaxation mechanism 139 absorbs the stress components in a stretching or compressing direction parallel to the torsion bar 110.

In the above-described eighth embodiment, the inner frame 107 serving as a support unit for the mirror 103 extends between the mirror 103 of the micro-mirror element 102 including the inner frame 107 and one of the two mirrors 103 adjacent to the mirror 103, and both ends are connected to the outer frames 108. For that reason, by aligning the micro-mirror elements 112, 122, 132 so as to be close to each other, the mirrors 103 can become close to each other in the mirror alignment direction. As a result, according to the present embodiment, mirror occupancy of the mirrors 103 rotating around two axes can be enhanced without any limitation in alignment of the micro-mirror elements 112, 122, 132.

In the present embodiment, its first modification and second modification, the micro-mirror elements 112, 122, 132 have stress relaxation mechanisms (third connection) 119, 129, 139 disposed in at least one of three sites, which are inside the inner frame 107, between the inner frame 107 and the torsion bar (second connection) 110, and between the torsion bar 110 and the outer frame 108. Additionally, the spring constant $k_{12}$ of the torsion bar 110 and the spring constant $k_{13}$ of the stress relaxation mechanisms 119, 129, 139 in response to displacement in a direction parallel to the torsion bar 110 are in the relationship $k_{13} < k_{12}$, and the spring constant $k_{22}$ of the torsion bar 110 and the spring constant $k_{23}$ of the stress relaxation mechanisms 119, 129, 139 in response to displacement in a direction of rotation around the rotation axis of the torsion bar 110 are in the relationship $k_{23} \geq k_{22}$.

For that reason, the stress relaxation mechanisms 119, 129, 139 can disperse stress by changing its shape in response to the stretching or compressing stress from the torsion bar 110. In addition, the stress relaxation mechanisms 119, 129, 139 have a high rigidity to torque in a rotation direction around the rotation axis of the torsion bar 110, and can stabilize characteristics of the rotation operation around the rotation axis of the torsion bar 110 to reduce the stress of the above-described stretching or compressing stress.

Moreover, in the present embodiment, the stress relaxation mechanisms 119, 129, 139 have planar units 119a, 119b, 129a, 139a perpendicular to the torsion bar 110, and the thickness Wa of these planar units in a direction parallel to the torsion bar 110 is half the width Wf of the inner frame 107 or less. For that reason, the relaxation of the stress by means of the stress relaxation mechanisms 119, 129, 139 and the strength of the inner frame 107 can be balanced. Relaxation of the stress by providing the planar units allows for simplifying the configuration that satisfies the above-described two relationships of the spring constants.

In the meantime, in order to realize an attenuator function 404 illustrated in FIG. 20 and explained later, the rotation angle of the mirror 103 needs to be delicately adjusted with a 0.01° accuracy. The rotation of the mirror 103 around the rotation axis of the torsion bar 106 (first axis A1) realizes switching of output destinations of output signal lights and the optical attenuator function.

The inner frame 107 has a structure that easily changes its shape in response to the stress when the stress acts on the outer frame 108 from the outside (e.g., the influence of thermal expansion caused by changes in environmental temperature). In response to the changed shape of the inner frame 107, the rotation torque generated in the mirror-side movable electrode 105 and the mirror-side fixed electrode 107a and the spring constant of the torsion bar 106 are modified. Consequently, the rotation angle of the mirror 103 is slightly displaced, resulting in a possible risk of causing slight deviation in the optical attenuator function explained later. However, according to the present embodiment, such deviation of the function can be controlled.

<Regarding Optical Switch>

The micro-mirror array according to the above-described first to eighth embodiments can be used for optical switches and others, as described above. In order to facilitate understanding of the micro-mirror arrays and others, an example of an optical switch is explained in the following description.

In recent years, application of devices having a microstructure formed by using micromachining technology has been attempted in various technical fields. These devices have characteristics such as extremely small components and reduced deterioration of mechanical characteristics. Application of the created micro-mirror elements to optical switches and others has been in progress in the optical communications field. One of the applications is a wavelength selecting switch.

In optical communication, in order to deal with drastically increasing Internet traffic, introduction of optical systems in networks has been in progress at a high speed with a core of Wavelength Division Multiplexing (WDM) communication.

Optical switches (hereinafter referred to as "wavelength selecting switch") 201, 301 are disposed in nodes in a mesh-topology network illustrated in FIG. 18 or a ring-topology network illustrated in FIG. 19, for example, and have a function of sorting the input wavelengths into arbitrarily output ports.

Figure 18:
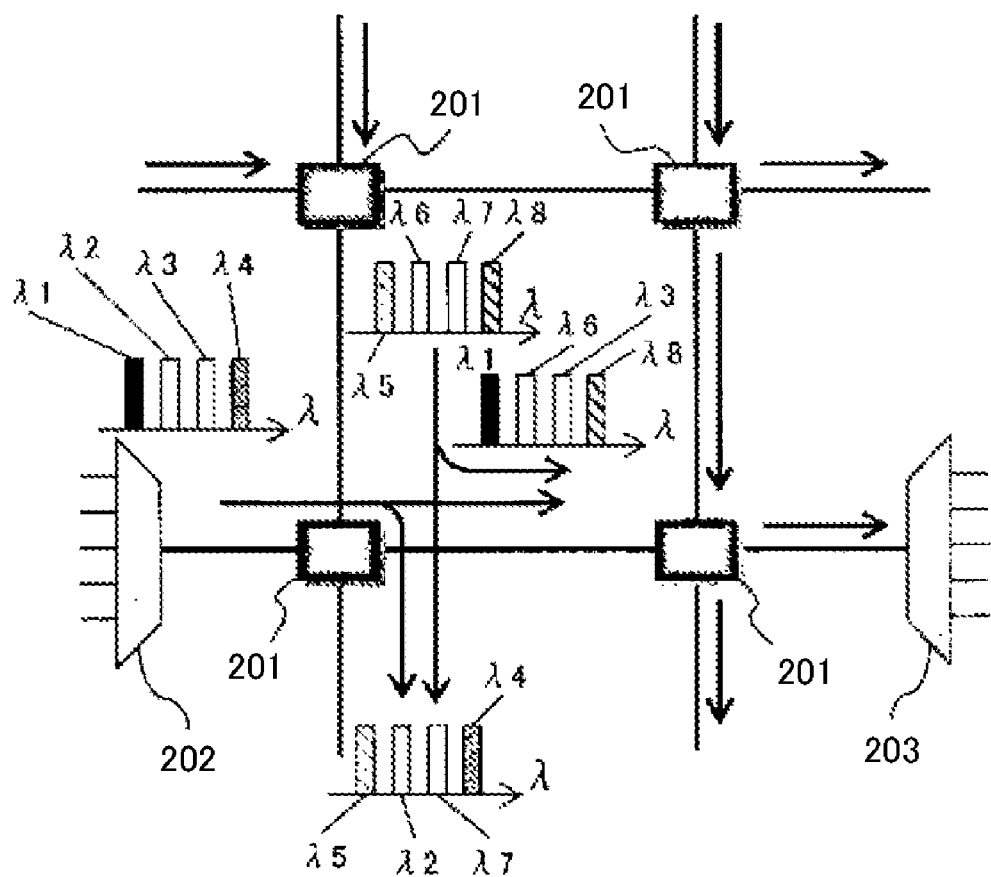
FIG. 18 is a block diagram illustrating a configuration of a mesh-topology network to which a wavelength selection switch is applied.

It should be noted that the mesh-topology network illustrated in FIG. 18 has a multiplexer 202, a splitter 203 and others, and the ring-topology network illustrated in FIG. 19 has a multiplexer 302 to add (insert) light and a splitter 303 to drop (split) light in an OADM (Optical Add Drop Multiplexer) node.

Figure 20:
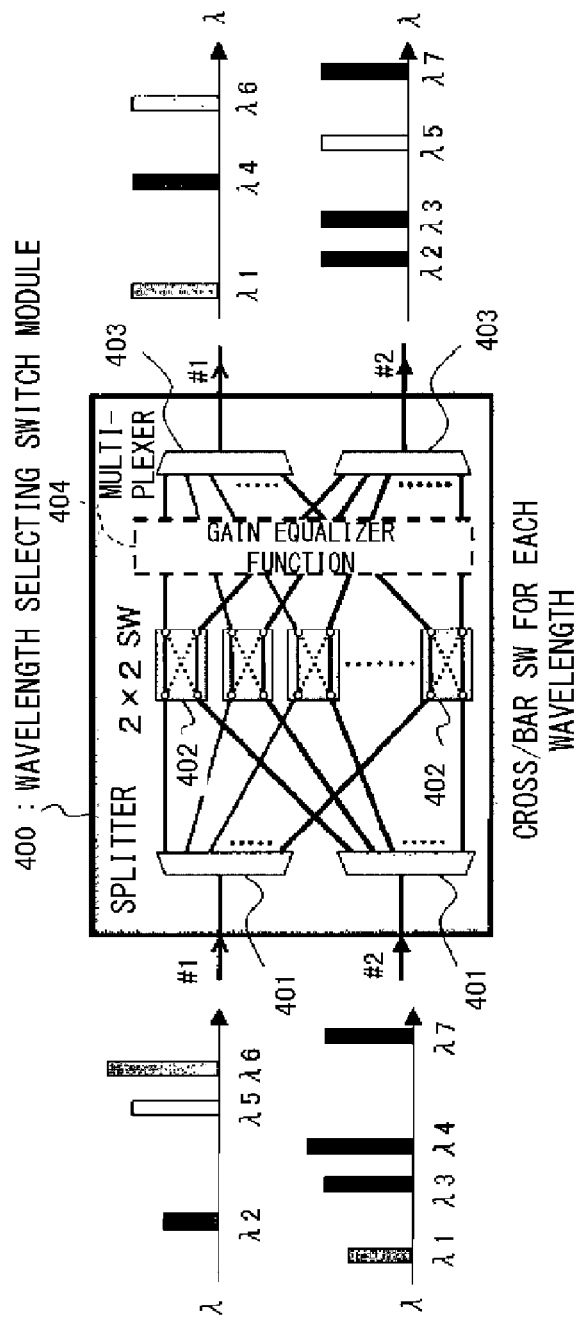
FIG. 20 is a block diagram illustrating a configuration of a wavelength selecting switch.

This sorting function of the wavelength selection switch is, in other words, equivalent to a function as a cross/bar switch for every wavelength as illustrated in FIG. 20. A wavelength selecting switch 400 has splitters 401 in accordance with the number of input ports corresponding to input optical channels (input fiber), plural 2×2 switches 402, and multiplexers 403 in accordance with the number of output ports corresponding to output optical channels (output fiber). WDM light input from an input port is split into every wavelength (channel) in the corresponding splitter 401, undergoes output switching in units of wavelengths (cross or bar switching) in accordance with the setting in any of the 2×2 switches 402, and further undergoes wavelength multiplexing with light with other wavelengths in any of the multiplexers 403. Afterwards, the WDM light is output to the corresponding output port.

In the example in FIG. 20, FIG. 20 illustrates that WDM light with wavelengths $\lambda 2$, $\lambda 5$, and $\lambda 6$ is input to an input port #1, and WDM light with wavelengths $\lambda 1$, $\lambda 3$, $\lambda 4$ and $\lambda 7$ is input to an input port #2. At the cross or bar switching in the 2×2 switches 402, the light with wavelengths $\lambda 1$, $\lambda 4$ and $\lambda 6$ is switched and output to an output port #1 and the rest of the light with wavelength $\lambda 2$, $\lambda 3$, $\lambda 5$ and $\lambda 7$ is switched and output to an output port #2.

In FIG. 20, the reference code 404 indicates a gain equalizer (optical attenuator) function, and in the spatial coupling type wavelength selecting switch 400, this function can be realized, for example, by appropriately deviating a collecting position to the output fiber from the center of the core so as to vary an amount of optical coupling to the core.

More specifically, as illustrated in FIG. 21, a spatial-coupling type wavelength selecting switch 500 has, in its major portion, a collimator array 511 constituting an input/output optical system, an optical splitter 512 constituting a splitter optical system for splitting the input WDM light into each wavelength, a collecting lens 513 constituting a collecting optical system, and a micro-mirror array 514 that is a switching device provided on a substrate 510, for example.

Here, the collimator array 511 has a function of converting the light that has entered from the input optical fiber into collimated light and to collect the collimated light that has entered from the optical splitter 512 to the core of the output fiber.

The optical splitter 512 reflects the entering light to different directions (angles) in accordance with the wavelengths, and a diffraction grating 512 illustrated in FIG. 23 is generally used.

The collecting lens 513, while collecting the light split into every wavelength by the optical splitter 512 to a predetermined micro-mirror array 514, collects light reflected form the micro-mirror array 514 and outputs the collected light to the collimator array 511 via the optical splitter 512.

The micro-mirror array 514 functions as a switching device that performs port switching by reflecting the light entering from the input fiber 511-1 to any of the output fibers 511-2, 511-3, 511-4. As illustrated in FIG. 1 and FIG. 13, the micro-mirror elements 2, 102 are disposed in an array.

Figure 22A:
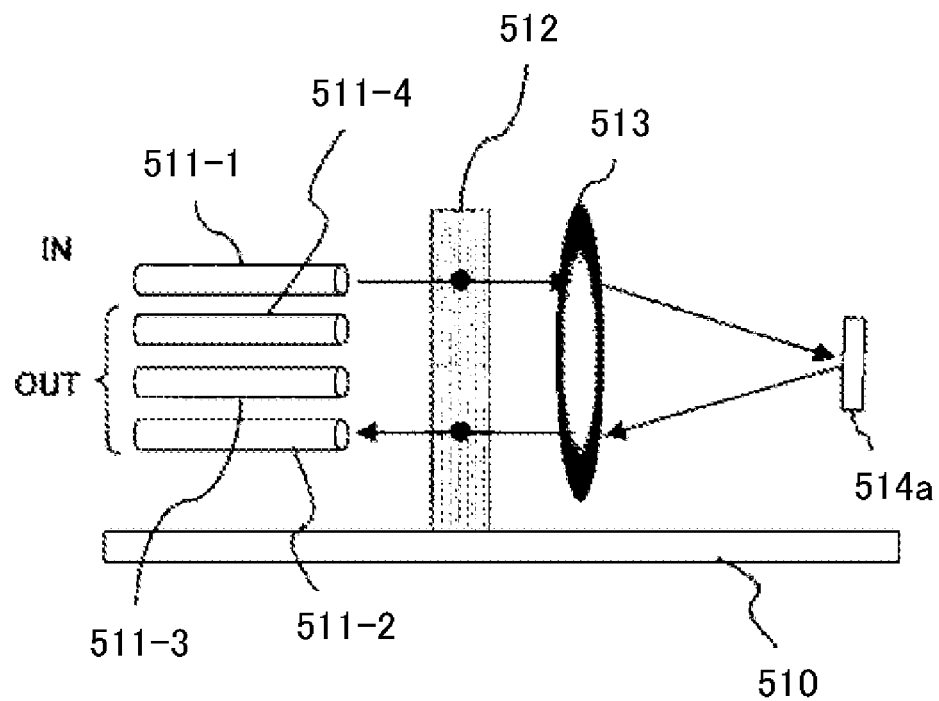
FIG. 22A is an explanatory diagram (1) for explaining an operation (port switching operation) of the wavelength selecting switch of FIG. 21.
Figure 22B:
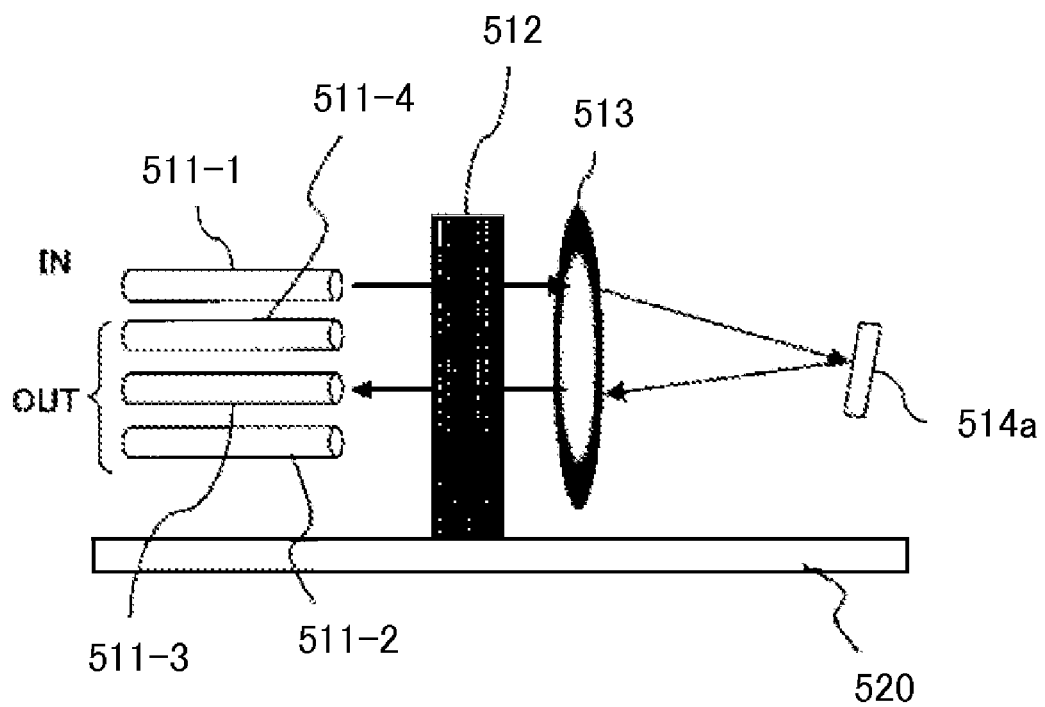
FIG. 22B is an explanatory diagram (2) for explaining an operation (port switching operation) of the wavelength selecting switch of FIG. 21.

Input light is light split into every wavelength by the optical splitter (diffraction grating) 512, and a single mirror 514a is disposed with respect to one wavelength band. The mirror 514a is configured to have variable rotation angles as illustrated in FIG. 22A and FIG. 22B, and an output port is determined by the rotation angles. By individually controlling the rotation angle of each mirror 514a, the output ports are switched for each wavelength.

In addition, in the adjustment of the rotation angle of the micro-mirror array 514, fine adjustment of the rotation angle allows for adjustment of the amount of optical coupling to the core of the output fibers 511-2, 511-3, 511-4. With this adjustment, the above-described optical attenuator function 404 illustrated in FIG. 20 can be realized as well as the output destination switching function.

The above-described micro-mirror elements of the first to eighth embodiments use a mirror that is rotatable in two axial directions orthogonal to each other. In a case in which the rotation angle of the mirror is made only in one axial direction, when the output destination of an optical signal is switched from 511-2 to 511-4 in FIG. 21, an optical signal enters 511-3, although it is instantaneous. In order to prevent this, rotation angles in two directions, a rotation direction to switch the output destination of the output signal and a rotation in a direction to switch on/off the coupling of the optical signal to the fiber, can be used.

According to the above-described embodiments, mirrors can be made close to each other in the mirror alignment direction, and therefore the mirror occupancy can be enhanced.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A micro-mirror array including a plurality of micro-mirror elements, each comprising a mirror rotating around two axes and a support unit connected to an outer frame and supporting said mirror, wherein
said support unit extends between said mirror of the micro-mirror element including said support unit and only one of two mirrors adjacent to said mirror so that said support unit is not located in between said mirror and the other of the two mirrors, both ends of said support unit being connected to the outer frame.

2. The micro-mirror array according to claim 1, wherein said mirror rotates around two axes including a first axis and a second axis, and
said support unit comprises an inner frame rotating around the second axis and supporting said mirror so as to be rotatable around the first axis.

3. The micro-mirror array according to claim 2, wherein the inner frame comprises the second axis extending in a straight line between said mirror of the micro-mirror elements including the inner frame and one of two mirrors adjacent to said mirror, both ends of the second axis being connected to the outer frame.

4. The micro-mirror array according to claim 2, wherein the micro-mirror elements further include a balancer that maintains centers of gravity of the inner frame and a portion rotating with the inner frame around the second axis as close as possible to the second axis.

5. The micro-mirror array according to claim 4, wherein the balancer maintains centers of gravity of the inner frame and a portion rotating with the inner frame around the second axis as close as possible to a center of the second axis in a longitudinal direction.

6. The micro-mirror array according to claim 4, wherein the inner frame rotates a portion of the inner frame as the second axis, and
the balancer is disposed on the second axis.

7. The micro-mirror array according to claim 2, wherein the support unit further includes a reinforcing beam unit for supporting the inner frame so as to be rotatable around the second axis,
the reinforcing beam unit extends said mirror of the micro-mirror elements including the reinforcing beam unit and one of two mirrors adjacent to said mirror, both ends of the reinforcing beam unit being connected to the outer frame.

8. The micro-mirror array according to claim 7, wherein the inner frame rotates around the reinforcing beam unit as the second axis and is supported by the reinforcing beam unit at at least an end on said mirror side or nearby.

9. The micro-mirror array according to claim 7, wherein the inner frame comprises the second axis, one end on said mirror side being supported by the reinforcing beam unit and another end being supported by the outer frame.

10. The micro-mirror array according to claim 7, wherein the reinforcing beam unit comprises a driving unit for driving an inner frame of a micro-mirror element adjacent to a micro-mirror element including the reinforcing beam.

11. The micro-mirror array according to claim 2, wherein the inner frame extends said mirror supported by the inner frame and an adjacent mirror on a side in which said mirror rotates toward a back surface side when said mirror rotates around the second axis.

12. The micro-mirror array according to claim 2, wherein the inner frame is formed from two or more layers and extends between said mirrors, and one or more layers is missing at least in a portion extending between said mirrors.

13. The micro-mirror array according to claim 12, wherein the inner frame is formed with one or more layers on a front side of said mirror missing at least in a portion extending between said mirrors.

14. The micro-mirror array according to claim 2, wherein the micro-mirror elements comprises a driving unit causing said mirror to rotate around the first axis,
the inner frame extends so as to enclose the driving unit between said mirrors, and
said mirror forms a gap with an adjacent inner frame on a side of the enclosing portion, which is smaller than a gap between a portion of the inner frame supporting said mirror enclosing the driving unit and the adjacent inner frame.

15. The micro-mirror array according to claim 2, wherein the micro-mirror elements include:
a first connection unit serving as the first axis for connecting said mirror to the inner frame in a rotatable manner;
a second connection unit serving as the second axis for connecting said inner frame to the outer frame in a rotatable manner; and
a third connection unit disposed in at least one of three positions including between the inner frame and the second connection unit, between the second connection unit and the outer frame, and inside of the inner frame,
wherein a spring constant $k_{12}$ of the second connection unit and a spring constant $k_{13}$ of the third connection unit in response to displacement in a direction parallel to the second connection unit is in the relationship $k_{13} < k_{12}$, and a spring constant $k_{22}$ of the second connection unit and a spring constant $k_{23}$ of the third connection unit in response to displacement in a direction of rotation around the rotation axis of the second connection unit is in the relationship $k_{23} \geqq k_{22}$.

16. The micro-mirror array according to claim 15, wherein the third connection unit comprises a planar unit that is approximately perpendicular to the second connection unit, and
a thickness of the planar unit in a direction parallel to the second connection unit is half a width of the inner frame or less.

17. An optical switch including a micro-mirror array including a plurality of micro-mirror elements, each comprising a mirror rotating around two axes and a support unit connected to an outer frame and supporting said mirror, wherein
said support unit extends between said mirror of the micro-mirror element including said support unit and one of two mirrors adjacent to said mirror so that said support unit is not located in between said mirror and the other of the two mirrors, both ends of said support unit being connected to the outer frame.

* * * * *